United States Patent
Yamaguchi et al.

(10) Patent No.: US 12,190,904 B2
(45) Date of Patent: Jan. 7, 2025

(54) ANOMALY DETECTION APPARATUS, PROBABILITY DISTRIBUTION LEARNING APPARATUS, AUTOENCODER LEARNING APPARATUS, DATA TRANSFORMATION APPARATUS, AND PROGRAM

(71) Applicant: NIPPON TELEGRAPH AND TELEPHONE CORPORATION, Tokyo (JP)

(72) Inventors: Masataka Yamaguchi, Tokyo (JP); Yuma Koizumi, Tokyo (JP); Noboru Harada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 509 days.

(21) Appl. No.: 17/266,240

(22) PCT Filed: Jul. 4, 2019

(86) PCT No.: PCT/JP2019/026556
§ 371 (c)(1),
(2) Date: Feb. 5, 2021

(87) PCT Pub. No.: WO2020/031570
PCT Pub. Date: Feb. 13, 2020

(65) Prior Publication Data
US 2021/0327456 A1  Oct. 21, 2021

(30) Foreign Application Priority Data

Aug. 10, 2018  (JP) .................................. 2018-151412
Nov. 7, 2018   (JP) .................................. 2018-209416

(51) Int. Cl.
*G10L 25/51*   (2013.01)
*G06N 3/045*   (2023.01)
(Continued)

(52) U.S. Cl.
CPC .............. *G10L 25/51* (2013.01); *G06N 3/045* (2023.01); *G06N 3/088* (2013.01); *G10L 25/30* (2013.01)

(58) Field of Classification Search
CPC ......... G10L 25/51; G10L 25/30; G06N 3/045; G06N 3/088
See application file for complete search history.

(56) References Cited

U.S. PATENT DOCUMENTS 6,139,505 A * 10/2000 Murphy ................. A61B 5/061
                                                    600/528
9,576,583 B1   2/2017 Betts
(Continued)

FOREIGN PATENT DOCUMENTS

EP   0666542 A2   8/1995
EP   3477553 A1 * 5/2019   ........... G06K 9/6256
(Continued)

OTHER PUBLICATIONS

Leveau et al. (2017) "Adversarial Autoencoders for Novelty Detection" Workshop track—ICLR 2017.
(Continued)

*Primary Examiner* — Olisa Anwah

(57) ABSTRACT

An anomaly detection technique which realizes high accuracy while reducing cost required for normal model learning is provided. An anomaly detection apparatus includes an anomaly degree estimating unit configured to estimate an anomaly degree indicating a degree of anomaly of anomaly detection target equipment from sound emitted from the anomaly detection target equipment (hereinafter, referred to as anomaly detection target sound) based on association between a first probability distribution indicating distribution of normal sound emitted from one or more pieces of equipment different from the anomaly detection target equipment and normal sound emitted from the anomaly (Continued)

detection target equipment (hereinafter, referred to as normal sound for adaptive learning).

19 Claims, 13 Drawing Sheets

(51) Int. Cl.
*G06N 3/088* (2023.01)
*G10L 25/30* (2013.01)

(56) References Cited

U.S. PATENT DOCUMENTS

| | | | |
|---|---|---|---|
| 10,652,257 B1* | 5/2020 | Shah | G06F 11/3452 |
| 11,157,782 B2* | 10/2021 | Bathen | G06N 3/044 |
| 11,475,910 B2* | 10/2022 | Jun | H04R 1/08 |
| 11,921,566 B2* | 3/2024 | Okanohara | G06N 7/00 |
| 2008/0059119 A1* | 3/2008 | Hashimoto | G01H 3/08 |
| | | | 702/183 |
| 2015/0242754 A1* | 8/2015 | Fukuda | G06N 20/00 |
| | | | 706/12 |
| 2016/0379456 A1 | 12/2016 | Nongpiur et al. | |
| 2018/0264613 A1* | 9/2018 | Tamai | B23Q 17/007 |
| 2018/0365089 A1* | 12/2018 | Okanohara | G06F 11/0703 |
| 2019/0163599 A1* | 5/2019 | Breuer | G06F 11/16 |
| 2019/0376840 A1* | 12/2019 | Koizumi | G01H 17/00 |
| 2019/0377325 A1* | 12/2019 | Angola Abreu | G06N 3/047 |
| 2020/0209842 A1* | 7/2020 | Koizumi | G06N 7/01 |
| 2020/0349470 A1* | 11/2020 | Ikeda | G06V 10/82 |
| 2021/0048488 A1* | 2/2021 | Das | G06N 3/08 |
| 2021/0089884 A1* | 3/2021 | Macready | G06N 3/08 |
| 2021/0326728 A1* | 10/2021 | Kawachi | G06N 3/047 |

FOREIGN PATENT DOCUMENTS

| | | |
|---|---|---|
| JP | H07219581 A | 8/1995 |
| WO | 2018136915 A1 | 7/2018 |

OTHER PUBLICATIONS

Ide et al., (2015) "Anomaly Detection and Change Detection", Kodansha, pp. 6-7.
Choi et al., (2018) "StarGAN: Unified Generative Adversarial Networks for Multi-Domain Image-to-Image Translation", IEEE Conference on Computer Vision and Pattern Recognition (CVPR) 2018, pp. 8789-8797.
Yamaguchi et al., (2018) "Study of Abnormal Sound Detection Model for Fast Adaptation to New Domains," 2018 Autumn Meeting Acoustic Society of Japan, published on Aug. 29, 2018, pp. 311-314 with its English translation generated by computer.
Zhang et al. (2018) "Adversarial adaptive 1-D convolutional neural networks for bearing fault diagnosis under varying working condition" arXiv:1805.00778, May 9, 2018.

* cited by examiner

ANOMALY DETECTION APPARATUS, PROBABILITY DISTRIBUTION LEARNING APPARATUS, AUTOENCODER LEARNING APPARATUS, DATA TRANSFORMATION APPARATUS, AND PROGRAM

CROSS-REFERENCE TO RELATED APPLICATIONS

This application is a U.S. 371 Application of International Patent Application No. PCT/JP2019/026556, filed on 4 Jul. 2019, which application claims priority to and the benefit of JP Application No. 2018-151412, filed on 10 Aug. 2018 and JP Application No. 2018-209416, filed on 7 Nov. 2018, the disclosures of which are hereby incorporated herein by reference in their entireties.

TECHNICAL FIELD

The present invention relates to an anomaly detection technique and a domain transformation technique.

BACKGROUND ART

For example, if operation of commercial equipment such as large manufacturing machine and molding machine installed at a factory is stopped due to trouble, service is largely obstructed. It is therefore necessary to monitor an operating condition on a daily basis and, in a case where anomaly occurs, immediately cope with the anomaly. As a method for addressing this problem, there is a method in which a management service provider of commercial equipment regularly dispatches a maintenance worker to the site, and the maintenance worker confirms abrasion, or the like, of parts. However, because this method costs a lot of money (for example, personnel expenses and traveling expenses) and requires a large amount of manpower, it is difficult to perform this method on all commercial equipment and factories. Therefore, as an alternative technique, there is a method in which an operating condition is monitored on a daily basis based on operating sound collected by a microphone provided inside the equipment. Specifically, the operating sound is analyzed, and in a case where sound (anomalous sound) which is considered to be anomalous is detected, an alert is issued. A technique of determining whether equipment to be monitored is in a normal state or in an abnormal state by utilizing sound in this manner is referred to as an anomalous sound detection technique.

In the anomalous sound detection technique, it costs money to set a type of anomalous sound and a detection method for each type or each piece of equipment. Therefore, it is necessary to automatically design a rule for detecting anomalous sound. As one of solutions to this, anomalous sound detection based on statistical methods is well known (Non-patent literature 1). This anomalous sound detection based on the statistical methods is roughly divided into supervised anomalous sound detection and unsupervised anomalous sound detection. In the supervised anomalous sound detection, a large amount of normal sound and anomalous sound is collected as learning data, and a discriminator is learned so that a discrimination rate (a rate of normal sound being able to be discriminated from anomalous sound) is maximized. Meanwhile, in the unsupervised anomalous sound detection, a large amount of only normal sound is collected as learning data, and a probability distribution (hereinafter, referred to as a normal model) regarding occurrence of normal sound is learned. Then, the sound is determined as normal in a case where it is determined using the normal model that newly collected sound (that is, sound for which anomaly detection is to be performed) is similar to (highly likely to be) normal sound, while the sound is determined as anomalous in a case where it is determined that the newly collected sound is not similar to (unlikely to be) normal sound.

Because it is difficult to collect a large amount of learning data of anomalous sound in an industrial application field, unsupervised anomalous sound detection is often employed. Further, in the industrial application field, there is a case where it is desired to respectively set a large number of pieces of equipment of the same type as anomaly detection targets. For example, such a case can include a case where it is desired to monitor anomalous sound of an enormous number of servers existing in a data center. In this case, while anomaly detection systems are respectively applied to the respective servers, it is assumed that distribution of sound emitted from the respective servers slightly varies due to locations where the servers are installed or due to assembly errors. Therefore, as a method for applying anomaly detection systems to such a large number of pieces of equipment of the same type, there can be the following method.

(1) A normal model common to some pieces of equipment is learned using normal sound collected from these pieces of equipment. Then, anomaly detection is performed on all pieces of equipment using this common model.

(2) Normal models different for each piece of equipment is learned using normal sound collected for each piece of equipment. Then, anomaly detection of each piece of equipment is performed using these individual models.

With the method of (1), because learning is not performed for each piece of equipment, even if the number of pieces of equipment which is desired to be monitored increases, it is not necessary to collect learning data or perform model learning, so that it is possible to reduce cost relating to data collection and learning. However, because it is impossible to capture a slight difference regarding occurrence of normal sound for each piece of equipment, there is a possibility that anomaly detection cannot be performed with high accuracy. Further, with the method of (2), while it is expected that a normal model with high accuracy is generated because learning is performed using only normal sound obtained from the respective pieces of equipment, because it is necessary to collect learning data for each piece of equipment to perform model learning, there is a problem that it costs money to collect data and perform learning in accordance with increase in the number of pieces of equipment which is desired to be monitored.

Domain transformation will be described next. Domain transformation is a technique of transforming data of a certain domain into data of a domain different from the domain. Here, target data is, for example, an image or sound. For example, as disclosed in Reference non-patent literature 1, domain transformation is a technique of transforming an "image of a landscape photograph" into an "image of a landscape" or transforming an "image of a photograph of a horse" into an "image of a photograph of a zebra".

(Reference non-patent literature 1: Jun-Yan Zhu, Taesung Park, Phillip Isola, Alexei A. Efros, "Unpaired Image-to-Image Translation using Cycle-Consistent Adversarial Networks", arXiv:1703.10593v5, https://arxiv.org/abs/1703.10593v5)

To realize domain transformation, it is only necessary to create a data transformer which transforms a domain D into a domain D'. To create such a data transformer, there can be a method in which, for example, a large number of pairs of "landscape photographs" and "landscapes" which are obtained by accurately portraying the landscape photographs are collected as learning data, and transformation from the "landscape photographs" into the "landscapes" is learned using a neural network. Hereinafter, a framework of causing a data transformer to perform learning using pairs of data of two domains in this manner will be referred to as domain transformation with pair data. The domain transformation with pair data has advantages that it is possible to configure a data transformer relatively easily through learning using pairs of data of two domains which are input and a correct answer to the input as learning data. However, it is necessary to collect a large number of pieces of learning data. In the example of "landscape photographs" and "landscapes" described above, first, it is necessary to collect "landscape photographs", and then, create "landscapes" which are obtained by accurately portraying the "landscape photographs" (by, for example, requesting an artist to create the landscapes). Further, in the example of a "photograph of a horse" and a "photograph of a zebra", because it is difficult to take photographs with the same composition, it is realistically impossible to collect learning data.

Therefore, in recent years, to solve a problem regarding collection of learning data, a framework has been proposed which is capable of learning a data transformer without using pair data. This framework will be referred to as domain transformation without pair data. In the domain transformation without pair data, a data transformer which transforms data of a domain D into data of a domain D' is learned using the data of the domain D and the data of the domain D'. Here, the data of the domain D and the data of the domain D' which are to be used for learning do not have to be a pair. It is therefore possible to learn a data transformer even for transformation between domains for which it is difficult to collect pair data, such as a "photograph of a horse" and a "photograph of a zebra".

As an example of the domain transformation without pair data, for example, a method called StarGAN disclosed in Non-patent literature 2 has been proposed.

PRIOR ART LITERATURE

Non-Patent Literature

Non-patent literature 1: Tsuyoshi Ide, Masashi Sugiyama, "Anomaly Detection and Change Detection", Kodansha, pp. 6-7, 2015.
Non-patent literature 2: Yunjey Choi, Minje Choi, Munyoung Kim, Jung-Woo Ha, Sunghun Kim, Jaegul Choo, "StarGAN: Unified Generative Adversarial Networks for Multi-Domain Image-to-Image Translation", IEEE Conference on Computer Vision and Pattern Recognition (CVPR) 2018, pp. 8789-8797, 2018.

SUMMARY OF THE INVENTION

Problems to be Solved by the Invention

First, a first problem will be described.
As described above, with the methods of (1) and (2), there is a problem of trade-off between cost relating to data collection and learning and accuracy of anomaly detection. Therefore, as a third method, there can be the following method.
(3) A normal model common to some pieces of equipment is learned using normal sound collected from these pieces of equipment. Then, normal models different for each piece of equipment is adaptively learned from this common model using normal sound collected for each piece of equipment. Then, anomaly detection of each piece of equipment is performed using these individual adapted normal models.

While, with the method of (3), there is a possibility that the above-described problem of trade-off can be solved, to actually realize such a method, it is only necessary to enable a relatively small amount of normal sound to be collected for each piece of equipment for which anomaly detection is to be performed, and enable efficient learning of normal models adapted to respective pieces of equipment from the common normal model using the normal sound. However, such a method has not been developed so far.

This is the first problem.

Next, a second problem will be described.

With StarGAN disclosed in Non-patent literature 2, while domain transformation without pair data is realized by utilizing a method called Generative Adversarial Networks (GAN) disclosed in Reference non-patent literature 2, there is a problem that learning is unstable.
(Reference non-patent literature 2: Ian J. Goodfellow, Jean Pouget-Abadie, Mehdi Mirza, Bing Xu, David Warde-Farley, Sherjil Ozair, Aaron Courville, Yoshua Bengio, "Generative Adversarial Nets", Advances in Neural Information Processing Systems 27 (NIPS 2014), 2018.)

This is the second problem.

Therefore, the present invention is directed to providing an anomaly detection technique which realizes high accuracy while reducing cost required for normal model learning, and a domain transformation technique which enables stable learning without pair data.

Means to Solve the Problems

One aspect of the present invention is an anomaly detection apparatus comprising an anomaly degree estimating unit configured to estimate an anomaly degree indicating a degree of anomaly of anomaly detection target equipment from sound emitted from the anomaly detection target equipment (hereinafter, referred to as anomaly detection target sound) based on association between a first probability distribution indicating distribution of normal sound emitted from one or more pieces of equipment different from the anomaly detection target equipment and normal sound emitted from the anomaly detection target equipment (hereinafter, referred to as normal sound for adaptive learning).

One aspect of the present invention is a probability distribution learning apparatus comprising a learning unit configured to learn a first probability distribution indicating distribution of normal sound emitted from one or more pieces of equipment different from anomaly detection target equipment (hereinafter, referred to as normal sound for learning) from normal sound emitted from the one or more pieces of equipment different from the anomaly detection target equipment, wherein a variable x of the first probability distribution $q_1(x;\theta)$ is a variable indicating input data generated from the normal sound emitted from the one or more pieces of equipment different from the anomaly detection target equipment, the variable x is expressed as $x=f_K(f_{K-1}(\ldots(f_1(z_0))\ldots))$ using transformations $f_i$ (i=1, ..., K, K is an integer of 1 or greater, and inverse transformations $f_i^{-1}$ exist for the transformations $f_i$) and a latent variable $z_0$, $q_0(z_0)$ is set as a probability distribution of the latent variable $z_0$, a probability density $q_1(x;\theta)$ of the input data x is calculated using a probability density $q_0(z_0)$ of the latent variable $z_0=f_1^{-1}(f_2^{-1}(\ldots(f_K^{-1}(x))\ldots))$ corresponding to the input data x, and at least one inverse transformation of the transformations $f_i(i=1, \ldots, K)$ is adaptive batch normalization.

One aspect of the present invention is an anomaly detection apparatus comprising an anomaly degree estimating unit configured to estimate an anomaly degree indicating a degree of anomaly of anomaly detection target equipment from sound emitted from the anomaly detection target equipment (hereinafter, referred to as anomaly detection target sound) based on association between a first autoencoder which restores normal sound emitted from one or more pieces of equipment different from the anomaly detection target equipment and normal sound emitted from the anomaly detection target equipment (hereinafter, referred to as normal sound for adaptive learning).

One aspect of the present invention is an autoencoder learning apparatus comprising a learning unit configured to learn a first autoencoder which restores normal sound emitted from one or more pieces of equipment different from anomaly detection target equipment (hereinafter, referred to as normal sound for learning) from normal sound emitted from the one or more pieces of equipment different from the anomaly detection target equipment, wherein the first autoencoder is configured as a neural network including an AdaBN layer which executes calculation of adaptive batch normalization.

One aspect of the present invention is an anomaly detection apparatus comprising an anomaly degree estimating unit configured to estimate an anomaly degree indicating a degree of anomaly of anomaly detection target equipment from sound emitted from the anomaly detection target equipment (hereinafter, referred to as anomaly detection target sound) based on association between a set of normal sound emitted from one or more pieces of equipment different from the anomaly detection target equipment and normal sound emitted from the anomaly detection target equipment (hereinafter, referred to as normal sound for adaptive learning).

One aspect of the present invention is a data transformation apparatus comprising a latent variable calculating unit configured to calculate a latent variable from input data corresponding to domain data of a first domain, and an output data calculating unit configured to calculate output data corresponding to domain data of a second domain from the latent variable, wherein the latent variable calculating unit performs calculation using a predetermined function (hereinafter, referred to as a first function) having an inverse function, the output data calculating unit performs calculation using a predetermined function (hereinafter, referred to as a second function) having an inverse function, and the first function and the second function are derived from a predetermined function which transforms the latent variable $z_0$ into a variable x.

Effects of the Invention

According to the present invention, it is possible to perform anomaly detection with high accuracy while reducing cost required for normal model learning. Further, according to the present invention, it is possible to realize domain transformation which enables stable learning without pair data.

DETAILED DESCRIPTION OF THE EMBODIMENTS

Figure 1:
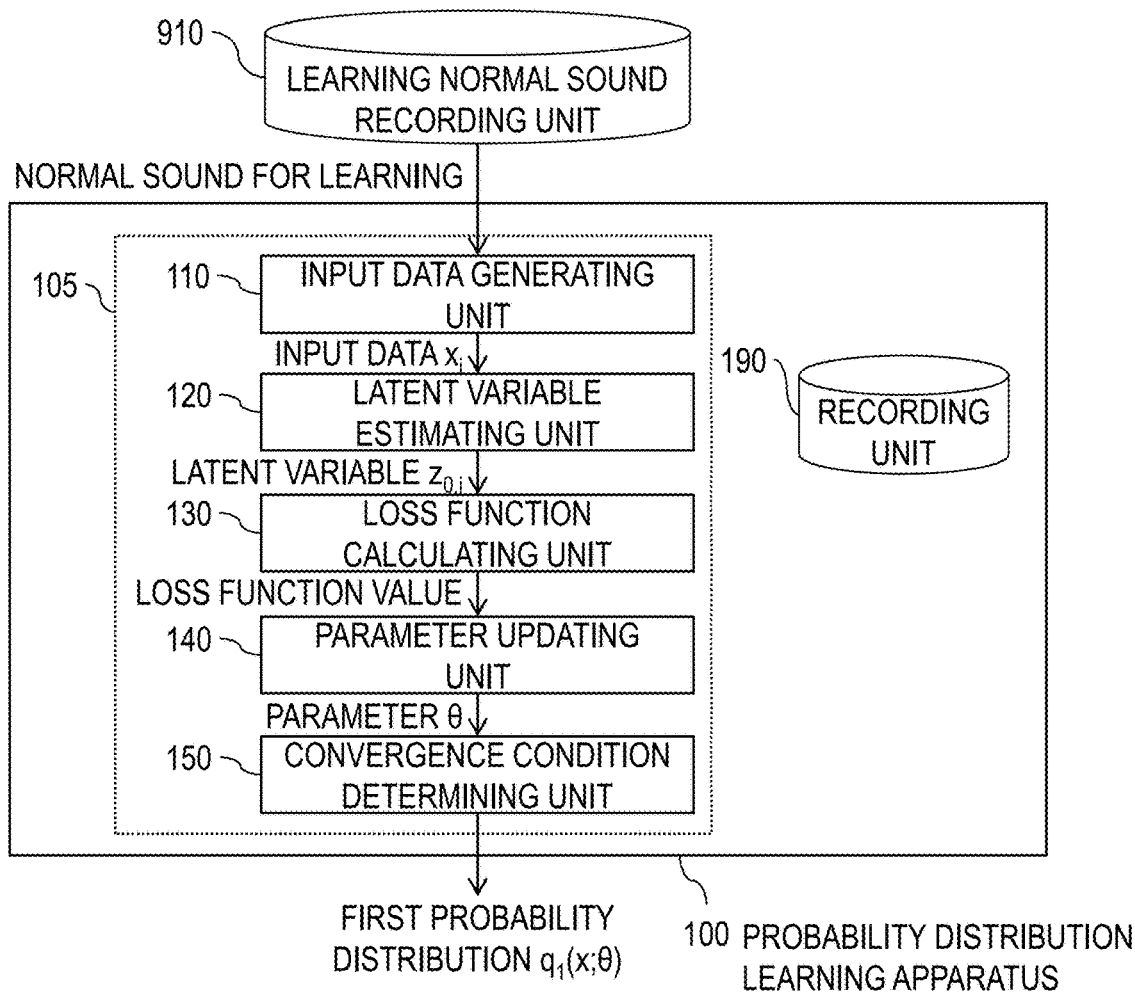
FIG. 1 is a block diagram illustrating an example of a configuration of a probability distribution learning apparatus 100.

Embodiments of the present invention will be described in detail below. Note that the same reference numerals will be assigned to components having the same function, and redundant description will be omitted.

<Notation>

_(underscore) indicates a subscript. For example, $x^{y\_z}$ indicates that $y_z$ is a superscript of x, and $x_{y\_z}$ indicates that $y_z$ is a subscript of x.

First, technical background of the first embodiment to the third embodiment of the present invention, and each embodiment will be described.

TECHNICAL BACKGROUND

Embodiments of the present invention provide a framework of anomaly detection which can be applied to a plurality of pieces of equipment of the same type. Specifically, the framework using the above-described method of (3) is provided. Based on a hypothesis that a difference in distribution of normal sound emitted from the respective pieces of equipment is expressed with an amount of statistics of feature amounts regarding sound, by causing an average which is a primary amount of statistics of the feature amounts and a variance which is a secondary amount of statistics to match between different pieces of equipment, it is made possible to derive normal models of different pieces of equipment from one model.

First, related art to be used in the embodiments of the present invention will be described.

<<Unsupervised Anomalous Sound Detection>>

Anomalous sound detection is a task of determining whether a state of equipment to be monitored which emits sound (observation signal) for which anomaly detection is to be performed is normal or abnormal. Here, as input data x to be generated from the observation signal, for example, a vector which includes a logarithmic amplitude spectrum $\ln|X_{t,f}|$ of the observation signal as an element can be used as in the following expression.

[Formula 1]

$$x:=(\ln|X_{t-Q,1}|, \ln|X_{t-Q,2}|, \ldots, \ln|X_{t-Q,F}|, \ln|X_{t-Q+1,1}|, \ln|X_{t-Q+1,2}|, \ldots, \ln|X_{t+Q,F}|)^T \quad (1)$$

Here, $t=\{1, \ldots, T\}$, $f=\{1, \ldots, F\}$ respectively indicate an index of time and an index of a frequency. Further, Q indicates the number of frames in the past and in the future, which is taken into account in input.

The input data x is not limited to the above-described examples, and other feature amounts may be used as input data to be generated from the observation signal.

Anomalous sound detection based on density estimation will be described next. It is assumed that input data to be generated from normal sound (hereinafter, simply referred to as input data of normal sound) is generated in accordance with a probability distribution p(x). First, a probability distribution $q(x;\theta)$ having a parameter $\theta$ is designed. Then, a parameter $\theta^*$ with which $q(x;\theta)$ becomes the closest to p(x) is obtained using a set $\{x_i\}_{i=1}^N$ of input data of N pieces of normal sound generated from the probability distribution p(x), and $q(x;\theta^*)$ is set as approximate distribution of p(x). Then, in a case where input data of sound for which anomaly detection is to be performed is input, an anomaly degree $A(x;\theta^*)$ regarding the input data is obtained using, for example, the following expression.

[Formula 2]

$$A(x;\theta^*) = -\ln q(x;\theta^*) \quad (2)$$

At last, a determination result R is obtained using, for example, the following expression.

[Formula 3]

$$R = H(A(x;\theta^*) - \phi) \quad (3)$$

Here, a threshold $\phi$ is a predetermined constant, and $H(\bullet)$ is a step function which returns 1 if an argument is not negative, and which returns 0 if the argument is negative. In a case where R=1, it is determined that equipment which has emitted the sound for which anomaly detection is to be performed is abnormal, while, in a case where R=0, it is determined that the equipment is normal. In other words, if the anomaly degree $A(x;\theta^*)$ is greater than a threshold $\phi$ set in advance, it is determined that the equipment is abnormal.

As described above, in anomalous sound detection based on density estimation, it is necessary to (1) design the probability distribution $q(x;\theta)$, and (2) decide the parameter $\theta$. In (1) design of the probability distribution $q(x;\theta)$, Normalizing Flow can be used. Further, in (2) decision of the parameter $\theta$, for example, learning using a gradient descent method in which a loss function (objective function) is $L(\theta) = -\Sigma \log q(x_i;\theta)$ (that is, a sum of negative log likelihoods with respect to a set $\{x_i\}_{i=1}^N$ of the input data of normal sound) can be used.

<<Normalizing Flow>>

Normalizing Flow is a method for obtaining distribution which approximates a probability distribution p(x) regarding data generation.

Normalizing Flow will be described below. It is assumed that $\{f_i(z)\}_{i=1}^K$ is K transformations having inverse transformations (where $f_i(z): R^D \to R^D$, R is a set of real numbers, and D is an integer of 1 or greater). Further, it is assumed that $f_i^{-1}(z)$ (i=1, ..., K) is an inverse transformation of $f_i(z)$.

In Normalizing Flow, it is considered that latent variables $\{z_{0,i}\}_{i=1}^N$ respectively corresponding to the set $\{x_i\}_{i=1}^N$ of N pieces of input data exist, and the input data $x_i$ is obtained by transforming the corresponding latent variable $z_{0,i}$ using the following expression using K transformations $\{f_i(z)\}_{i=1}^K$ and a latent variable $z_0$ of x.

[Formula 4]

$$x = f_K(f_{K-1}(\ldots (f_1(z_0))\ldots)) \quad (4)$$

In other words, the following expression holds for i=1, ..., K.

[Formula 5]

$$x_i = f_K(f_{K-1}(\ldots (f_1(z_{0,i}))\ldots)) \quad (4)'$$

Note that $z_1 = f_1(z_0)$, $z_2 = f_2(z_1)$, $x = f_K(z_{K-1})$.

Further, it is assumed that the latent variable $\{z_{0,i}\}_{i=1}^N$ is generated from a probability distribution $q_0(z_0)$ such as, for example, isotropic Gaussian distribution, with which it is easy to perform Monte Carlo sampling. At this time, the probability distribution $q(x;\theta)$ (where x is a variable indicating input data) with which a set of the input data $\{x_i\}_{i=1}^N$ complies can be expressed in the following form.

[Formula 6]

$$q(x;\theta) = q_0(z_0)|\det(\partial f_K(z_{K-1};\theta_K)/\partial z_{K-1})||\det(\partial f_{K-1}(z_{K-2};\theta_{K-1})/\partial z_{K-2})|\ldots|\det(\partial f_1(z_0;\theta_1)/\partial z_0)| \quad (5)$$

Here, $z_0 = f_1^{-1}(f_2^{-1}(\ldots (f_K^{-1}(x))\ldots))$. Further, $\{\theta_i\}_{i=1}^K$ is a parameter corresponding to a transformation $\{f_i(z)\}_{i=1}^K$, and $\theta = [\theta_1^T, \theta_2^T, \ldots, \theta_K^T]^T$.

Note that the probability distribution $q_0(z_0)$ is not limited to a distribution with which it is easy to perform Monte Carlo sampling, and is only required to be a distribution with which it is easy to perform strict probability density estimation. Examples of distributions with which it is easy to perform strict probability density estimation can include a probability distribution p(x) which satisfies the following conditions.

(Condition 1) A non-negative function $g(x)$ ($\geq 0$) on $R^D$ exists for the probability distribution $p(x)$, and $p(x)=g(x)/\int g(x)dx$ for arbitrary $x \in R^D$.

(Condition 2) It is easy to calculate $\int g(x)dx$ for a function $g(x)$.

Examples of the function which satisfies Condition 2 can include Gaussian distribution. Meanwhile, examples of the function which does not satisfy Condition 2 can include $g(x)=\exp(\sin(x)-x^2)$.

In Normalizing Flow, the parameter $\theta$ of the probability distribution $q(x;\theta)$ is learned using a set of the input data $\{x_i\}_{i=1}^N$. Then, the original probability distribution $p(x)$ regarding data generation is approximated by the probability distribution $q(x;\theta^*)$ using the parameter $\theta^*$ obtained through learning.

In Normalizing Flow, it is possible to use various kinds of transformation as the transformation $\{f_i(z)\}_{i=1}^K$. For example, it is possible to use Batch Normalization, Leaky ReLU (Rectified Linear Unit), or the like, disclosed in Reference non-patent literature 3. Further, it is also possible to use the following linear transformation disclosed in Reference non-patent literature 4.

[Formula 7]

$$f(z)=LUz \quad (6)$$

Here, $L, U \in R^{D \times D}$ are respectively a lower triangular matrix and an upper triangular matrix. This transformation is characterized in that, because an absolute value $|\det(\partial f(z;\theta)/\partial z)|$ of a Jacobian determinant can be calculated using an absolute value (that is, $|\Pi_{i=1}^D L_{ii} U_{ii}|$) of a product of diagonal elements of L and U, it is possible to easily calculate a probability density $q(x;\theta)$ of the input data x (it is possible to reduce calculation cost of the probability density $q(x;\theta)$ of the input data x) (see expression (5)).

(Reference non-patent literature 3: S. Ioffe, C. Szegedy, "Batch normalization: accelerating deep network training by reducing internal covariate shift", ICML 2015, 2015.)

(Reference non-patent literature 4: J. Oliva, et al., "Transformation Autoregressive Networks", ICML 2018, 2018.)

Batch Normalization BN: $x \to y$ ($x, y \in R^D$) will be briefly described below. In Batch Normalization BN, after adjustment is performed so that an average of elements of respective dimensions of the set $\{x_i\}_{i=1}^N$ of the input data becomes 0 and a variance becomes 1, scale transformation and shift transformation are performed. Specifically, $y_i = BN(x_i)$ is calculated using the following expression.

[Formula 8]

$$m = \frac{1}{N} \sum_{i=1}^N x_i \quad (7a)$$

$$s^2 = \frac{1}{N} \sum_{i=1}^N (x_i - m)^2 \quad (7b)$$

$$\hat{x}_i = \frac{x_i - m}{\sqrt{s^2 + \varepsilon}} \quad (7c)$$

$$y_i = \gamma \hat{x}_i + \beta \quad (7d)$$

Here, $\gamma$ and $\beta$ are respectively a scale transformation parameter and a shift transformation parameter, and both are parameters to be learned. Further, $\varepsilon$ is a non-negative real number, and, it is only necessary to set a positive real number as $\varepsilon$ in a case where it is desired to avoid division by zero, and set zero as c in a case where it is not necessary to avoid division by zero.

Note that, to clearly specify the scale transformation parameter $\gamma$ and the shift transformation parameter $\beta$, there is also a case where BN($\bullet$) is expressed as $BN_{\gamma\beta}(\bullet)$.

Further, not all of K transformations have to be transformations of the same type. Therefore, for example, it is also possible to combine some kinds of transformations such that a transformation $f_1(z)$ is batch normalization, and a transformation $f_2(z)$ is linear transformation.

<<AdaBN (Adaptive Batch Normalization)>>

Domain adaptation is a technique of adjusting a learned model so that, in a case where distribution of learning data to be used for model learning is different from distribution of test data which is a target of processing using the learned model, accuracy of the processing using the learned model does not degrade due to a difference between the distribution. Here, a set of learning data and a set of test data are domains, and they are sometimes respectively referred to as a domain for learning and a domain for test.

While there are various methods for domain adaptation which can be combined with a deep neural network (DNN), here, adaptive batch normalization will be described (see Reference non-patent literature 5). Adaptive batch normalization is a method in which calculation of an average and a variance and adjustment of an average and a variance in batch normalization (see expressions (7a) to (7d)) are performed for each domain. In other words, calculation using the expressions (7a) to (7c) is performed for each piece of data in the same domain. In actual test, an amount of statistics (average and variance) is calculated for a set $\{x_i\}_{i=1}^N$ of the input data of the domain for test, and a processing result $y_i$ is output using the expression (7c) and the expression (7d) using the amount of statistics. Note that, in a case where transformation is adaptive batch normalization, there is a case where transformation is expressed as AdaBN: $x \to y$ ($x, y \in R^D$).

(Reference non-patent literature 5: Y. Li, et al., "Revisiting Batch Normalization For Practical Domain Adaptation", ICLR 2017, 2016.)

Anomaly detection in the embodiments of the present invention will be described below. First, problem establishment for anomaly detection in the embodiments of the present invention will be described. Next, a specific configuration of anomaly detection in the embodiments of the present invention using the above-described related art will be described.

<<Problem Establishment>>

A problem to be solved is to "learn a second probability distribution which is a normal model which can be used for anomaly detection target equipment using a first probability distribution which is a common normal model learned using a large amount of normal sound obtained from a plurality of pieces of equipment and a small amount of normal sound obtained from the anomaly detection target equipment, and enable anomaly detection from sound emitted from the anomaly detection target equipment using this second probability distribution". Therefore, the following data is to be dealt with.

(1) Learning data: it is assumed that learning data is normal sound emitted from one or more pieces of equipment different from the anomaly detection target equipment and that it is possible to prepare a large amount of learning data. Because the learning data is used for learning, the sound will be referred to as normal sound for learning. Further, a set of the learning data will be referred to as a domain for learning.

Note that a type of equipment from which normal sound is to be collected is preferably the same as a type of the anomaly detection target equipment.

(2) Adaptive learning data: it is assumed that adaptive learning data is normal sound emitted from the anomaly detection target equipment and that only a small amount of adaptive learning data can be prepared. Because the adaptive learning data is used for adaptive learning, the sound will be referred to as normal sound for adaptive learning. Note that a set of the adaptive learning data is a domain for test which will be described later.

(3) Test data: test data is sound emitted from anomaly detection target equipment, and it is determined whether the equipment is normal or abnormal from this sound. Therefore, this sound will be referred to as anomaly detection target sound. Further, a set of the test data will be referred to as a domain for test.

Hereinafter, a phase in which learning is performed using normal sound for learning will be referred to as a learning phase, a phase in which adaptive learning is performed using normal sound for adaptive learning will be referred to as an adaptive learning phase, and a phase in which anomaly is detected from anomaly detection target sound will be referred to as a test phase (anomaly detection phase).

<<Points>>

In the embodiments of the present invention, to enable the second probability distribution to be adaptively learned from a small amount of adaptive learning data with a small calculation cost, adaptive batch normalization is introduced to Normalizing Flow. Specifically, at least one inverse transformation $f_i^{-1}(z)$ of K transformations $\{f_i(z)\}_{i=1}^K$ to be used in Normalizing Flow is adaptive batch normalization. Note that, in calculation of adaptive batch normalization, scale transformation and shift transformation, that is, calculation in the expression (7d) may be omitted. In other words, it is also possible to express that the inverse transformation $f_i^{-1}(z)$ is adaptive batch normalization in which $\gamma=1$ and $\beta=0$.

<<Specific Configuration>>

A specific configuration will be described below.

(1) Learning Phase

First, a neural network in which input data x generated from normal sound (that is, learning data) emitted from one or more pieces of equipment different from the anomaly detection target equipment is transformed into a latent variable $z_0(\sim q(z_0))$ which is regarded as being generated in accordance with the probability distribution $q_0(z_0)$ will be described. Here, a case will be described where five transformations $\{f_i(z)\}_{i=1}^5$ are used. In other words, $z_0$ can be obtained as $z_0=f_1^{-1}(f_2^{-1}(f_3^{-1}(f_4^{-1}(f_5^{-1}(x)))))$.

The above-described five transformations $\{f_i(z)\}_{i=1}^5$ will be defined using the following expression. Note that, for convenience sake, instead of a transformation $f_i$ being indicated, an inverse transformation $f_i^{-1}$ of the transformation $f_i$ is indicated (where $z_4=f_5^{-1}(x)$, $z_3=f_4^{-1}(z_4)$, $z_2=f_3^{-1}(z_3)$, $z_1=f_2^{-1}(z_2)$, $z_0=f_1^{-1}(z_1)$).

[Formula 9]

$$f_5^{-1}(x)=L_5 D_5 U_5 x \quad (8a)$$

$$f_4^{-1}(z_4)=\text{AdaBN}_{\gamma_4 \beta_4}(z_4) \quad (8b)$$

$$f_3^{-1}(z_3)=\text{LeakyReLU}(z_3)=\max(z_3, \alpha_3 z_3) \quad (8c)$$

$$f_2^{-1}(z_2)=L_2 D_2 U_2 z_2 \quad (8d)$$

$$f_1^{-1}(z_1)=\text{AdaBN}_{\gamma_1 \beta_1}(z_1) \quad (8e)$$

Here, $L_2$, $L_5 \in \mathbb{R}^{D \times D}$ is a lower triangular matrix whose diagonal element is 1, and all elements $L_{2,ij}$, $L_{5,ij}$ ($i \geq j$) other than an upper triangular portion are learning target parameters (that is, a parameter $\theta_2$ or a parameter $\theta_5$). $D_2$, $D_5 \in \mathbb{R}^{D \times D}$ is a diagonal matrix, and diagonal elements $D_{2,ij}$, $D_{5,ij}$ ($i \geq j$) are learning target parameters (that is, a parameter $\theta_2$ or a parameter $\theta_5$). $U_2$, $U_5 \in \mathbb{R}^{D \times D}$ is an upper triangular matrix whose diagonal element is 1, and all elements $U_{2,ij}$, $U_{5,ij}$ ($i \leq j$) other than a lower triangular portion are learning target parameters (that is, a parameter $\theta_2$ or a parameter $\theta_5$). Further, $\alpha_3$ ($\geq 0$) is a parameter of LeakyReLU, and may be set as a hyper parameter, or may be set as a learning target parameter (that is, a parameter $\theta_3$) (in a case where $\alpha_3$ is set as a learning target, ReLU is called Parametric ReLU (Reference non-patent literature 6)). Further, $\text{AdaBN}_{\gamma_4 \beta_4}(\bullet)$ and $\text{AdaBN}_{\gamma_1 \beta_1}(\bullet)$ are above-described adaptive batch normalization, and $\gamma_1$, $\beta_1$, $\gamma_4$, $\beta_4$ are learning target parameters (that is, a parameter $\theta_1$ or a parameter $\theta_4$).

(Reference non-patent literature 6: K. He, et al., "Delving Deep into Rectifiers: Surpassing Human-Level Performance on ImageNet Classification", ICCV 2015, pp. 1026-1034, 2015.)

Further, absolute values of Jacobian determinants of the transformations $\{f_i(z)\}_{i=1}^5$ are respectively calculated using the following expression (where $x=f_5(z_4)$, $z_4=f_4(z_3)$, $z_3=f_3(z_2)$, $z_2=f_2(z_1)$, $z_1=f_1(z_0)$).

[Formula 10]

$$|\det(\partial f_5(z_4)/\partial z_4)|=1/|\Pi_{i=1}^D D_{5,ii}| \quad (9a)$$

$$|\det(\partial f_4(z_3)/\partial z_3)|=\sqrt{s'_4{}^2+\varepsilon}/\gamma_4 \quad (9b)$$

$$|\det(\partial f_3(z_2)/\partial z_2)|=1/\gamma_3^\delta \quad (9c)$$

$$|\det(\partial f_2(z_1)/\partial z_1)|=1/|\Pi_{i=1}^D D_{2,ii}| \quad (9d)$$

$$|\det(\partial f_1(z_0)/\partial z_0)|=\sqrt{s'_1{}^2+\varepsilon}/\gamma_1 \quad (9e)$$

Here, $s_4'$ is a standard deviation of $z_4$ (corresponding to the input data x generated from learning data), $\delta$ is the number of elements below zero among $z_3$ (corresponding to the input data x generated from learning data), and $s_1'$ is a standard deviation of $z_1$ (corresponding to the input data x generated from learning data). Note that absolute values $|\det(\partial f_4(z_3)/\partial z_3)|$, $|\det(\partial f_1(z_0)/\partial z_0)|$ of Jacobian determinants for the transformations $f_4$ and $f_1$ are expressed using absolute values of Jacobian determinants upon deduction instead of upon learning (that is, upon processing using the learned model).

Further, as described above, it is assumed that the probability distribution $q_0(z_0)$ is a probability distribution with which it is easy to perform strict probability density estimation. For example, if Gaussian distribution $N(0, I)$ in which an average is 0 and a variance is an identity matrix $I$ is set as the probability distribution $q_0(z_0)$, the probability distribution $q_0(z_0)$ can be expressed using the following expression.

[Formula 11]

$$q_0(z_0)=-(2\pi)^{-D/2}\exp(-\|z_0\|_2^2) \quad (10)$$

Therefore, it can be understood that, by setting the probability distribution of the input data x generated from the learning data as $q_1(x;\theta)$ and using the expression (5), it is possible to calculate a probability density $q_1(x_i;\theta)$ of input data $x_i$ from the probability density $q_0(z_{0,i})$ of the latent variable $z_{0,i}$.

Subsequently, a learning method of the parameter θ will be described. In a similar manner to conventional learning of a neural network, it is possible to perform learning using, for example, a gradient descent method, Momentum SGD (Stochastic Gradient Descent), ADAM (Adaptive Moment Estimation) or combination thereof, using a loss function L(θ). In a case where Normalizing Flow is used, an average of negative log likelihoods defined using the following expression is often used as the loss function L(θ).

[Formula 12]

$$L(\theta) = -1/N \sum_{i=1}^{N} \log q_1(x_i; \theta) \quad (11)$$

Note that it is possible to use a mini batch learning method which is performed in units of a set of learning data called a mini batch in the above-described learning. Here, a mini batch refers to a plurality of pieces of learning data randomly selected from all learning data. A value of the loss function L(θ) is calculated for each mini batch.

(2) Adaptive Learning Phase

Next, an adaptive learning method of the probability distribution $q_2(x;\theta)$ of the input data x generated from normal sound (that is, adaptive learning data) emitted from the anomaly detection target equipment will be described. For example, it is only necessary to execute learning in the following procedure by utilizing $z_4 = f_5^{-1}(x)$, $z_3 = f_4^{-1}(z_4)$, $z_2 = f_3^{-1}(z_3)$, $z_1 = f_2^{-1}(z_2)$, $z_0 = f_1^{-1}(z_1)$. First, $\{z'_{4,i}\}_{i=1}^{M} (z'_{4,i} = f_5^{-1}(x'_i))$ is calculated from a set of input data $\{x'_i\}_{i=1}^{M}$. Then, an average and a variance of $\{z'_{4,i}\}_{i=1}^{M}$ is obtained. At last, the obtained average and variance are substituted for m, $s^2$ in the expression (7c). In a similar manner, $\{z'_{1,i}\}_{i=1}^{M} (z'_{1,i} = f_2^{-1}(f_3^{-1}(f_4^{-1}(f_5^{-1}(x'_i)))))$ is calculated from the set of the input data $\{x'_i\}_{i=1}^{M}$. Then, an average and a variance of $\{z'_{1,i}\}_{i=1}^{M}$ are obtained. At last, the obtained average and variance are substituted for m, $s^2$ in the expression (7c).

(3) Test Phase

As a method for anomaly detection, for example, it is possible to use the method described in <<Unsupervised anomalous sound detection>>.

<<Effects>>

By introducing adaptive batch normalization to Normalizing Flow, the following effects can be obtained.

(1) It becomes possible to adjust a difference between distribution of learning data and distribution of test data, so that it is possible to reduce degradation in accuracy of anomaly detection in the domain for test.

In a case where adaptive batch normalization is used in a final layer, it becomes possible to correct a gap in parallel translation and a scale in an axial direction of distribution of data between domains. Further, in a case where a difference in distribution of data between different domains is expressed with parallel translation and scaling in an axial direction, in principle, by introducing adaptive batch normalization in a first layer, it is possible to execute anomaly detection with high accuracy in the domain for test even if the parameter θ which has been learned in the domain for learning is applied to the domain for test without change.

(2) It is possible to adaptively learn the second probability distribution with a low calculation cost Processing which is necessary for adaptive learning of the second probability distribution is, as described above, basically merely calculation of an amount of statistics in adaptive batch normalization for the adaptive learning data. Therefore, adaptive learning can be executed with a lower calculation cost than that in a case where normal learning is repeated, so that it is possible to execute adaptive learning online in some cases.

Further, as in the above-described example, in a case where linear transformation is introduced in Normalizing Flow, by a matrix W corresponding to the linear transformation being subjected to LU decomposition or LDU decomposition, the following effects can be obtained.

(3) Calculation cost of probability density is reduced, so that learning cost is reduced.

In Normalizing Flow, it is necessary to calculate every Jacobian determinant of the linear transformation f. Therefore, in a case where the matrix W is held in a form without being subjected to LU decomposition or LDU decomposition, a calculation cost of $O(k^3)$ is required to calculate the determinant |W|, where k is an order of W. However, in a case where the matrix W is held in a form which is subjected to LU decomposition or LDU decomposition such that W=LU or W=LDU, because it is possible to obtain |W| using |W|=|LU|=|L|×|U| (that is, a product of all diagonal elements of L and U) or |W|=|LDU|=|L|×|D|×|U| (that is, a product of all diagonal elements of L and D and U), it is possible to perform calculation at extremely high speed.

First Embodiment

A case will be considered where, in a situation where two or more pieces of equipment of the same type exist, anomaly of one piece of equipment (which will be referred to as anomaly detection target equipment) among them is detected. To achieve this, first, a probability distribution (hereinafter, referred to as a first probability distribution) indicating distribution of normal sound (hereinafter, referred to as normal sound for learning) emitted from one or more pieces of equipment different from this anomaly detection target equipment is learned from the normal sound emitted from one or more pieces of equipment different from the anomaly detection target equipment (learning phase). Then, a probability distribution (hereinafter, referred to as a second probability distribution) indicating distribution of normal sound (hereinafter, referred to as normal sound for adaptive learning) emitted from the anomaly detection target equipment is adaptively learned from the first probability distribution using the normal sound emitted from the anomaly detection target equipment (adaptive learning phase). Then, it is determined whether or not the equipment is abnormal from sound (hereinafter, referred to as anomaly detection target sound) emitted from the anomaly detection target equipment (test phase (anomaly detection phase)).

The probability distribution learning apparatus 100 learns the first probability distribution from the normal sound for learning. The probability distribution adaptive learning apparatus 200 adaptively learns the second probability distribution from the first probability distribution using the normal sound for adaptive learning. The anomaly detection apparatus 300 determines whether or not the equipment is abnormal from the anomaly detection target sound.

Figure 2:
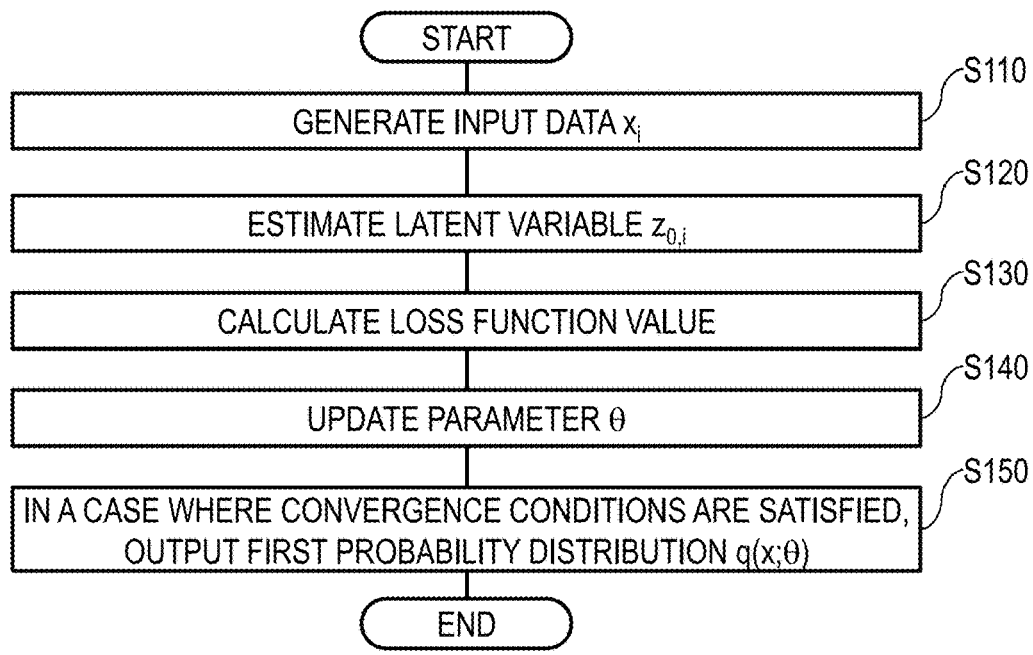
FIG. 2 is a flowchart illustrating an example of operation of the probability distribution learning apparatus 100.

The probability distribution learning apparatus 100 will be described below with reference to FIG. 1 to FIG. 2. FIG. 1 is a block diagram illustrating a configuration of the probability distribution learning apparatus 100. FIG. 2 is a flowchart illustrating operation of the probability distribution learning apparatus 100. As illustrated in FIG. 1, the probability distribution learning apparatus 100 includes an input data generating unit 110, a latent variable estimating unit 120, a loss function calculating unit 130, a parameter updating unit 140, a convergence condition determining unit 150 and a recording unit 190. The recording unit 190 is a component which records information necessary for processing of the probability distribution learning apparatus 100 as appropriate. The recording unit 190 records, for example, a parameter $\theta$ of the first probability distribution $q_1(x;\theta)$ which is to be learned. As an initial value of the parameter $\theta$, for example, a value generated using a random number is recorded.

The probability distribution learning apparatus 100 is connected to a learning normal sound recording unit 910. In the learning normal sound recording unit 910, normal sound for learning prepared in advance is recorded as learning data. As described above, it is preferable to prepare normal sound for learning as much as possible.

Operation of the probability distribution learning apparatus 100 will be described in accordance with FIG. 2. The input data generating unit 110 generates input data $x_i$ (i=1, . . . , N) from normal sound for learning $s_i$ (i=1, . . . , N) which is input (S110). For example, as in expression (1), it is only necessary to generate a vector which includes a logarithmic amplitude spectrum of the normal sound for learning $s_i$ as an element, and set this as the input data $x_i$. Note that it is also possible to use an acoustic feature amount other than that described above as the input data $x_i$ generated from the normal sound for learning $s_i$.

The latent variable estimating unit 120 estimates a latent variable $z_{0,i}$ (i=1, . . . , N) corresponding to the input data $x_i$ from the input data $x_i$ (i=1, . . . , N) generated in S110 using the parameter $\theta$ of the first probability distribution $q_1(x;\theta)$ (S120). Note that the parameter $\theta$ used here is a value which is being learned.

Here, a variable x of the first probability distribution $q_1(x;\theta)$ which is to be learned is a variable indicating input data generated from normal sound emitted from one or more pieces of equipment different from the anomaly detection target equipment, and the variable x is expressed as $x = f_K(f_{K-1}( \ldots (f_1(z_0)) \ldots ))$ using transformations $f_i$ (i=1, . . . , K, K is an integer of 1 or greater, and inverse transformations $f_i^{-1}$ exist for the transformations $f_i$) and the latent variable $z_0$.

Therefore, the latent variable $z_{0,i}$ corresponding to the input data $x_i$ is provided using the following expression.

[Formula 13]

$$z_{0,i} = f_1^{-1}(f_2^{-1}( \ldots (f_K^{-1}(x_i)) \ldots )) \quad (12)$$

Further, it is assumed that the latent variable $z_{0,i}$ (i=1, . . . , N) is generated in accordance with the probability distribution $q_0(z_0)$ of the latent variable $z_0$. However, the probability distribution $q_0(z_0)$ has characteristics that it is easy to perform strict probability density estimation.

Therefore, the probability distribution $q_1(x;\theta)$ can be expressed using the following expression using the probability distribution $q_0(z_0)$ (see expression (5)).

[Formula 14]

$$q_1(x;\theta) = q_0(z_0)|\det(\partial f_K(z_{K-1};\theta_K)/\partial z_{K-1})||\det(\partial f_{K-1}(z_{K-2};\theta_{K-1})/\partial z_{K-2})| \ldots |\det(\partial f_1(z_0;\theta_1)/\partial z_0)| \quad (5)'$$

Here, $\theta_i$ is a parameter corresponding to the transformation $f_i$, and $\theta = [\theta_1^T, \theta_2^T, \ldots, \theta_K^T]^T$.

The latent variable estimating unit 120 can be realized using a neural network NN which calculates the latent variable $z_0$ from the input data x. Note that the calculation expression is as follows.

[Formula 15]

$$z_0 = f_1^{-1}(f_2^{-1}( \ldots (f_K^{-1}(x)) \ldots )) \quad (12)'$$

In other words, the neural network NN receives input data x as input, proceeds with calculation sequentially from inverse transformations $f_K^{-1}$, $f_{K-1}^{-1}$, . . . , $f_2^{-1}$, $f_1^{-1}$, and finally outputs the latent variable $z_0$.

At least one inverse transformation $f_{i_0}^{-1}$ of the above-described transformations $f_i$ (i=1, . . . , K) (where $i_0$ is an integer which satisfies $1 \le i_0 \le K$) is made adaptive batch normalization. By this technique, it is possible to adaptively learn the second probability distribution $q_2(x;\theta)$ using a relatively small amount of normal sound for adaptive learning (see <<Points>>).

Further, at least one inverse transformation $f_{i_1}^{-1}$ of the transformations $f_i$ (i=1, . . . , K) (where $i_1$ is an integer which satisfies $1 \le i_1 \le K$) may be made linear transformation, and a matrix corresponding to the linear transformation may be expressed as a product of a lower triangular matrix and an upper triangular matrix, or a product of a lower triangular matrix, a diagonal matrix and an upper triangular matrix. By this technique, it becomes possible to execute calculation (calculation at the loss function calculating unit 130 which will be described later) of probability density which is required upon learning of the first probability distribution $q_1(x;\theta)$ at low cost (see (3) in <<Effects>>).

As a specific example of the transformations $f_i$ (i=1, . . . , K), it is possible to use five transformations whose inverse transformations can be expressed using expression (8a) to expression (8e) assuming that, for example, K=5.

The loss function calculating unit 130 calculates a value of the loss function $L(\theta)$ to be used for optimization of the parameter $\theta$ of the first probability distribution $q_1(x;\theta)$ from the latent variable $z_{0,i}$ (i=1, . . . , N) estimated in S120 (S130). The loss function $L(\theta)$ can be, for example, defined as an average of negative log likelihoods as in expression (11). At this time, while it is necessary to calculate the probability density $q_1(x_i;\theta)$ of the input data $x_i$ (i=1, . . . , N), the probability density $q_1(x_i;\theta)$ of the input data $x_i$ can be calculated using the probability density $q_0(z_{0,i})$ of the latent variable $z_{0,i}$ corresponding to the input data $x_i$. For example, in a case where the probability distribution $q_0(z_0)$ is Gaussian distribution N(0, I), the probability density $q_0(z_{0,i})$ of the latent variable $z_{0,i}$ can be calculated using the following expression.

[Formula 16]

$$q_0(z_{0,i}) = -(2\pi)^{-D/2} \exp(-\|z_{0,i}\|_2^2) \quad (10)'$$

So it is possible to calculate the probability density $q_1(x_i;\theta)$ of the input data $x_i$ from the above-described calculated probability density $q_0(z_{0,i})$ of the latent variable $z_{0,i}$ using expression (5)'.

The parameter updating unit 140 updates the parameter $\theta$ of the first probability distribution $q_1(x;\theta)$ so as to optimize (minimize) the value of the loss function $L(\theta)$ calculated in S130 (S140). For example, a gradient descent method is preferably used in updating of the parameter $\theta$.

The convergence condition determining unit 150 determines convergence conditions set in advance as termination conditions of parameter updating, outputs the first probability distribution $q_1(x;\theta)$ using the parameter $\theta$ updated in S140 in a case where the convergence conditions are satisfied, and repeats processing from S110 to S140 in a case where the convergence conditions are not satisfied (S150). As the convergence conditions, for example, a condition as to whether the number of times of execution of processing from S110 to S140 reaches a predetermined number of times can be employed. Upon output, the parameter $\theta$ (this parameter will be also referred to as the learned parameter) updated in S140, and inverse transformations $f_K^{-1}(x;\theta_K)$, $f_{K-1}^{-1}(z_{K-1};\theta_{K-1})$, . . . , $f_2^{-1}(z_2;\theta_2)$, $f_1^{-1}(z_1;\theta_1)$ may be output.

Note that a component including the input data generating unit 110, the latent variable estimating unit 120, the loss function calculating unit 130, the parameter updating unit 140 and the convergence condition determining unit 150 will be referred to as a learning unit 105. In other words, the learning unit 105 is a component which learns the first probability distribution from normal sound for learning.

According to the embodiment of the present invention, it is possible to learn the first probability distribution $q_1(x;\theta)$ which enables easy adjustment of a difference between distribution of learning data and distribution of test data.

<Modification>

While description has been provided assuming that the probability distribution learning apparatus 100 learns one first probability distribution $q_1(x;\theta)$ from normal sound for learning which is normal sound emitted from one or more pieces of equipment different from the anomaly detection target equipment, the probability distribution learning apparatus 100 may learn the first probability distribution $q_1^{(1)}(x;\theta), \ldots, q_1^{(W)}(x;\theta)$ indicating distribution of normal sound emitted from respective W pieces of equipment, while the number of one or more pieces of equipment different from the anomaly detection target equipment is set as W (W is an integer of 1 or greater). In this case, by an average and a variance in adaptive batch normalization being calculated for each piece of input data generated from normal sound for learning emitted from the same equipment among input data $x_i$ (i=1, ..., N) (corresponding to mini batch), the latent variable estimating unit 120 executes latent variable estimation processing. In other words, in calculation in adaptive batch normalization, W sets of averages and variances are used in place of one set of an average and a variance. However, the learned parameter $\theta$ is common among W sets of first probability distribution $q_1^{(1)}(x;\theta), \ldots, q_1^{(W)}(x;\theta)$, and there is one set of the learned parameter.

Second Embodiment

Figure 3:
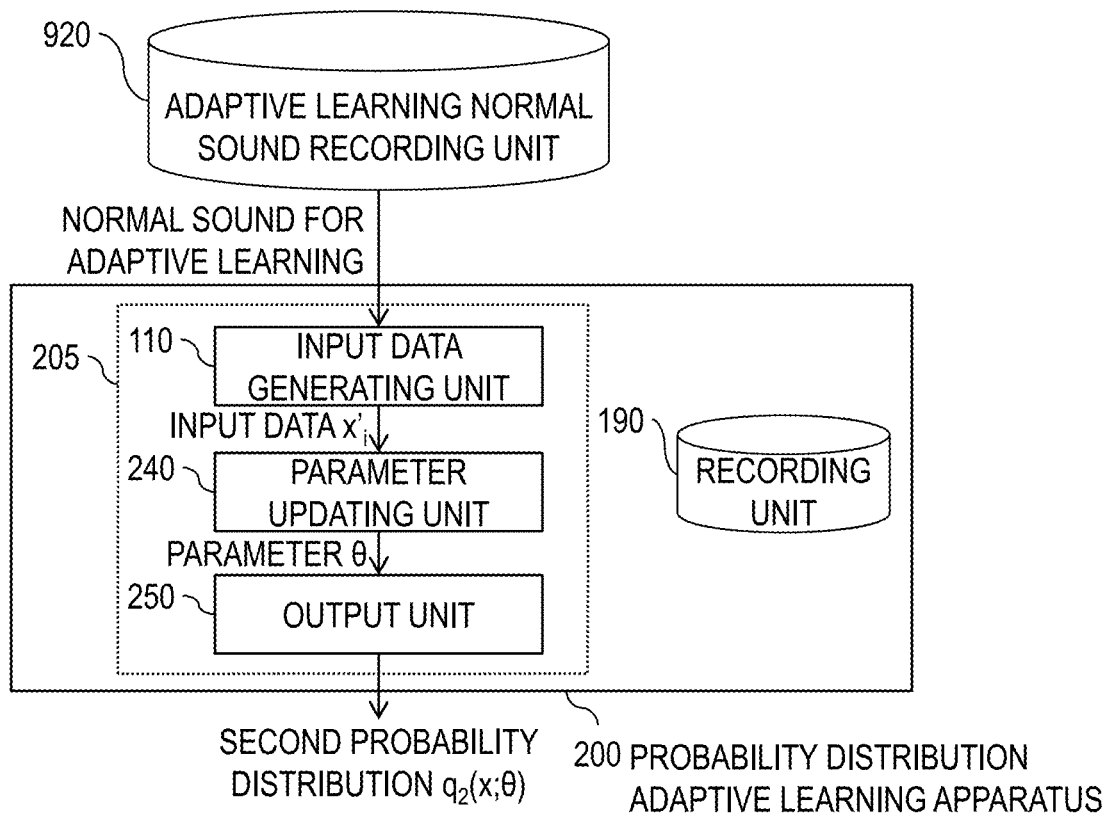
FIG. 3 is a block diagram illustrating an example of a configuration of a probability distribution adaptive learning apparatus 200.
Figure 4:
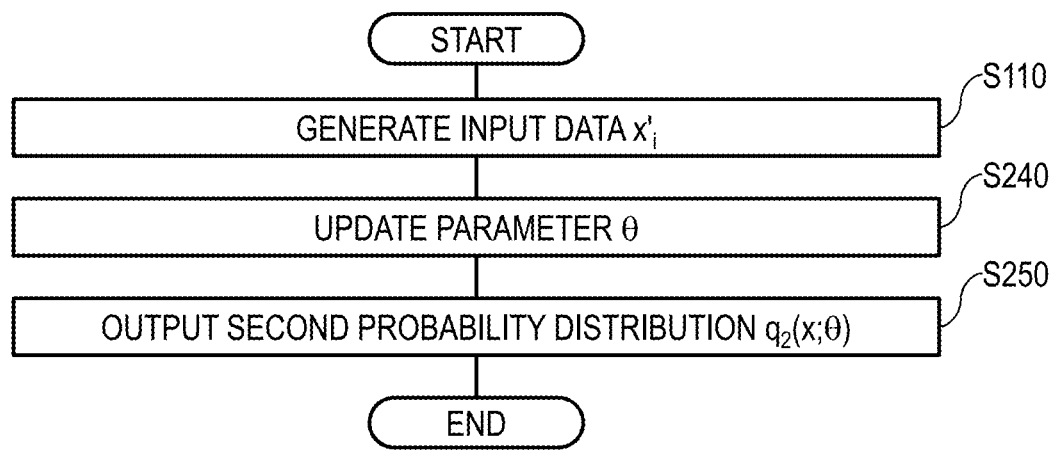
FIG. 4 is a flowchart illustrating an example of operation of the probability distribution adaptive learning apparatus 200.

The probability distribution adaptive learning apparatus 200 will be described below with reference to FIG. 3 to FIG. 4. FIG. 3 is a block diagram illustrating a configuration of the probability distribution adaptive learning apparatus 200. FIG. 4 is a flowchart illustrating operation of the probability distribution adaptive learning apparatus 200. As illustrated in FIG. 3, the probability distribution adaptive learning apparatus 200 includes the input data generating unit 110, a parameter updating unit 240, an output unit 250, and the recording unit 190. The recording unit 190 is a component which records information necessary for processing of the probability distribution adaptive learning apparatus 200 as appropriate. The recording unit 190, for example, records the parameter $\theta$ (that is, the learned parameter) of the first probability distribution $q_1(x;\theta)$ learned using the probability distribution learning apparatus 100. This learned parameter becomes an initial value of the parameter $\theta$ of the second probability distribution $q_2(x;\theta)$. Note that the variable x of the second probability distribution $q_2(x;\theta)$ is a variable indicating input data generated from normal sound emitted from the anomaly detection target equipment.

The probability distribution adaptive learning apparatus 200 is connected to an adaptive learning normal sound recording unit 920. In the adaptive learning normal sound recording unit 920, normal sound for adaptive learning prepared in advance is recorded as adaptive learning data. As described above, it is only necessary to prepare a relatively small amount of the normal sound for adaptive learning compared to an amount of normal sound for learning.

Operation of the probability distribution adaptive learning apparatus 200 will be described in accordance with FIG. 4. The input data generating unit 110 generates input data $x'_i$ (i=1, ..., M) from the normal sound for adaptive learning $s'_i$ (i=1, ..., M) which is input (S110). Here, while the number of pieces of normal sound for adaptive learning M is basically an integer which does not exceed the number of pieces of normal sound for learning N, the number of pieces of normal sound for adaptive learning M may be an integer which exceeds the number of pieces of normal sound for learning N.

The parameter updating unit 240 updates the parameter $\theta$ of the second probability distribution $q_2(x;\theta)$ using the input data $x'_i$ (i=1, ..., M) generated in S110 (S240). Specifically, for a transformation $f_{i\_0}$ whose inverse transformation is adaptive batch normalization, it is only necessary to update an average and a variance to be used for calculation with an average and a variance of the input data $z'_{i\_0,i}(=f_{i\_0-1}^{-1}(f_{i\_0-2}^{-1}(\ldots(f_K^{-1}(x'_i))\ldots)))$ to be input to an inverse transformation $f_{i\_0}^{-1}$ calculated from the input data $x'_i$ (i=1, ..., M). In other words, an average and a variance of input data $z'_{i\_0,i}$ (i=1, ..., M) are substituted for m and $s^2$ in expression (7c).

The output unit 250 outputs the second probability distribution $q_2(x;\theta)$ using the parameter $\theta$ updated in S240 (S250). Further, upon output, the parameter $\theta$ (this parameter will be also referred to as the learned parameter) updated in S240, and inverse transformations $f_K^{-1}(x;\theta_K)$, $f_{K-1}^{-1}(z_{K-1};\theta_{K-1})$, $f_2^{-1}(z_2;\theta_2)$, $f_1^{-1}(z_1;\theta_1)$ may be output.

Note that a component including the input data generating unit 110, the parameter updating unit 240 and the output unit 250 will be referred to as an adaptive learning unit 205. In other words, the adaptive learning unit 205 is a component which adaptively learns the second probability distribution from the first probability distribution using the normal sound for adaptive learning.

According to the embodiment of the present invention, it is possible to learn the second probability distribution $q_2(x;\theta)$ by adjusting a difference between distribution of learning data and distribution of test data.

<Modification>

Also, in a case where the probability distribution learning apparatus 100 learns W first probability distributions $q_1^{(1)}(x;\theta), \ldots, q_1^{(W)}(x;\theta)$, there is only one set of the learned parameter $\theta$. The probability distribution adaptive learning apparatus 200 performs adaptive learning using this one set of the parameter.

Third Embodiment

Figure 5:
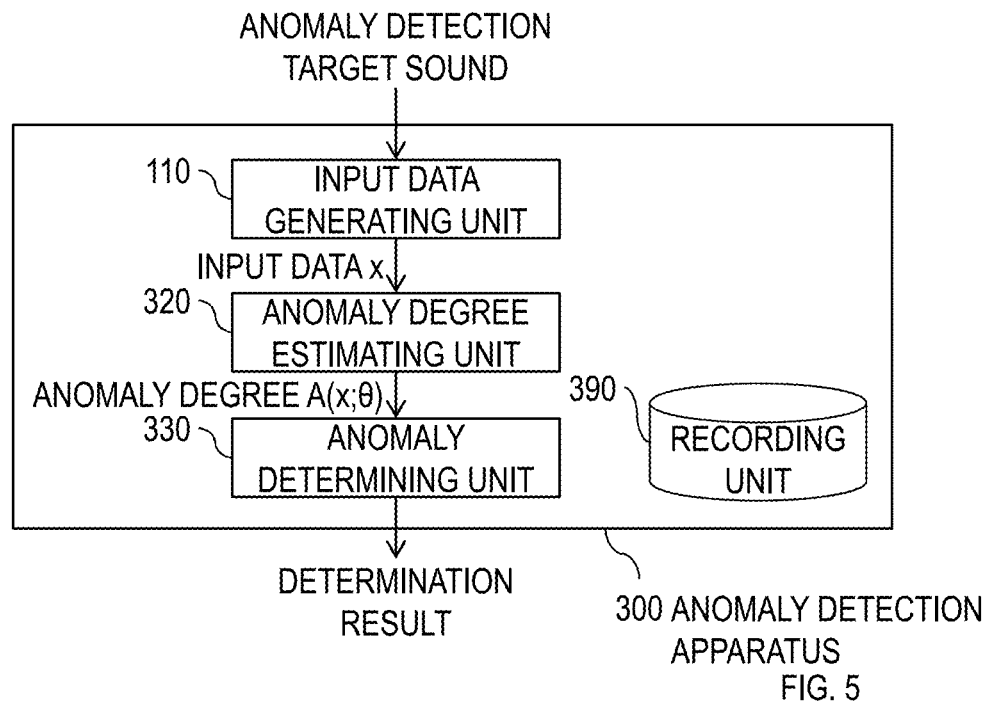
FIG. 5 is a block diagram illustrating an example of a configuration of an anomaly detection apparatus 300.
Figure 6:
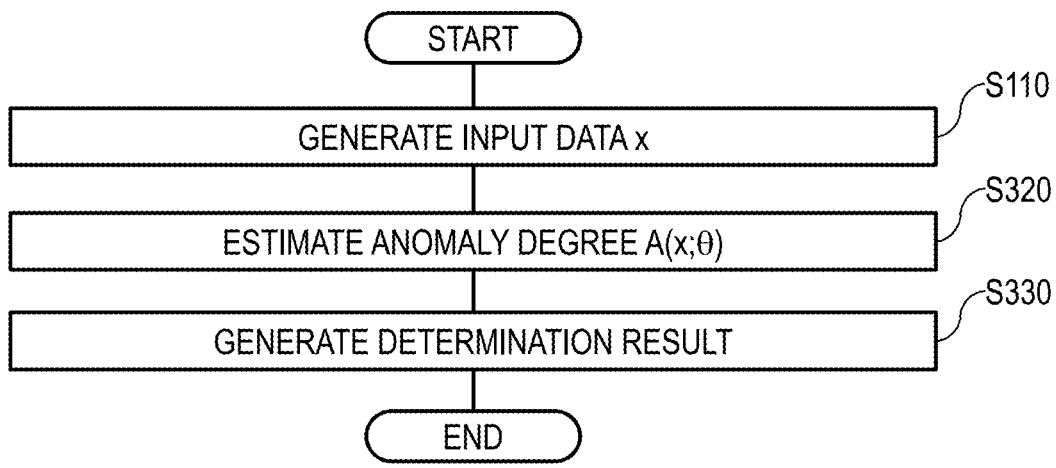
FIG. 6 is a flowchart illustrating an example of operation of the anomaly detection apparatus 300.

The anomaly detection apparatus 300 will be described below with reference to FIG. 5 to FIG. 6. FIG. 5 is a block diagram illustrating a configuration of the anomaly detection apparatus 300. FIG. 6 is a flowchart illustrating operation of the anomaly detection apparatus 300. As illustrated in FIG. 5, the anomaly detection apparatus 300 includes the input data generating unit 110, an anomaly degree estimating unit 320, an anomaly determining unit 330 and a recording unit 390. The recording unit 390 is a component which records information necessary for processing of the anomaly detection apparatus 300 as appropriate. The recording unit 390, for example, records the parameter $\theta$ (that is, the learned parameter) of the second probability distribution $q_2(x;\theta)$ which has been learned using the probability distribution adaptive learning apparatus 200.

In other words, the anomaly detection apparatus 300 executes anomaly detection using the second probability distribution $q_2(x;\theta)$ which uses this learned parameter, as the learned second probability distribution.

The operation of the anomaly detection apparatus 300 will be described in accordance with FIG. 6. The input data generating unit 110 generates the input data x from anomaly detection target sound s which is input (S110).

Figure 7:
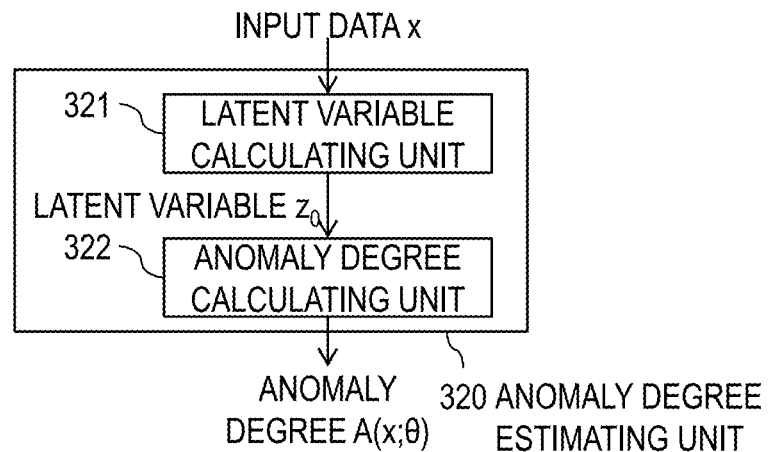
FIG. 7 is a block diagram illustrating an example of a configuration of an anomaly degree estimating unit 320.
Figure 8:
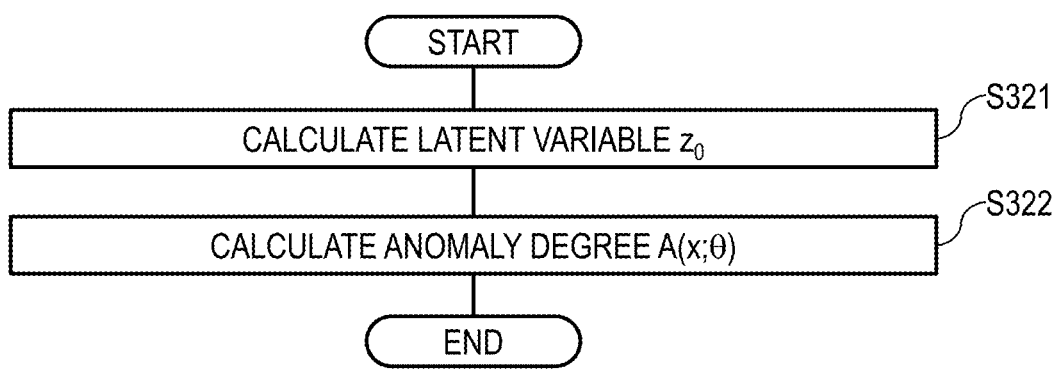
FIG. 8 is a flowchart illustrating an example of operation of the anomaly degree estimating unit 320.

The anomaly degree estimating unit 320 estimates an anomaly degree which indicates a degree of anomaly of equipment from the input data x generated in S110 based on the learned second probability distribution $q_2(x;\theta)$ (S320). The anomaly degree estimating unit 320 will be described below with reference to FIG. 7 and FIG. 8. FIG. 7 is a block diagram illustrating a configuration of the anomaly degree estimating unit 320. FIG. 8 is a flowchart illustrating operation of the anomaly degree estimating unit 320. As illustrated in FIG. 7, the anomaly degree estimating unit 320 includes a latent variable calculating unit 321 and an anomaly degree calculating unit 322.

The operation of the anomaly degree estimating unit 320 will be described in accordance with FIG. 8. The latent variable calculating unit 321 calculates a latent variable $z_0$ corresponding to the input data x from the input data x generated in S110 (S321). Specifically, the latent variable $z_0$ can be calculated using a neural network in which the learned parameter of the second probability distribution is set as a parameter of the neural network NN.

The anomaly degree calculating unit 322 calculates an anomaly degree $A(x;\theta)$ regarding the input data x from the latent variable $z_0$ calculated in S321 (S322). The anomaly degree can be, for example, calculated using the following expression.

[Formula 17]

$$A(x;\theta)=-\ln q_2(x;\theta) \quad (2)'$$

In a case where the probability distribution $q_0(z_0)$ is distribution with which it is easy to perform strict probability density estimation, the probability density $q_2(x;\theta)$ of the input data x can be calculated using the following expression.

[Formula 18]

$$q_2(x;\theta)=q_0(z_0)|\det(\partial f_K(z_{K-1};\theta_K)/\partial z_{K-1})||\det(\partial f_{K-1}(z_{K-2};\theta_{K-1})/\partial z_{K-2})| \ldots |\det(\partial f_1(z_0;\theta_1)/\partial z_0)| \quad (5)''$$

Upon calculation of expression (5)'', for example, in a case where the probability distribution $q_0(z_0)$ is Gaussian distribution N(0, I) and inverse transformations are five transformations which can be expressed with expression (8a) to expression (8e), it is only necessary to use expression (10) and expression (9a) to expression (9e).

The anomaly degree determining unit 330 generates a determination result indicating whether or not the equipment is abnormal from the anomaly degree $A(x;\theta)$ estimated in S320 (S330). For example, it is only necessary to generate a determination result indicating abnormal in a case where R=1, and generate a determination result indicating normal in a case where R=0 using expression (3).

In other words, it can be said that the anomaly detection apparatus 300 includes the anomaly degree estimating unit 320 which estimates an anomaly degree indicating a degree of anomaly of the anomaly detection target equipment from sound emitted from the anomaly detection target equipment (anomaly detection target sound) based on association between the first probability distribution indicating distribution of normal sound emitted from one or more pieces of equipment different from the anomaly detection target equipment and normal sound (normal sound for adaptive learning) emitted from the anomaly detection target equipment. An example of the association is the second probability distribution indicating distribution of the normal sound emitted from the anomaly detection target equipment, which is obtained by updating the first probability distribution using the normal sound for adaptive learning.

According to the embodiment of the present invention, by performing anomaly detection using the second probability distribution obtained by adjusting a difference between the distribution of learning data and distribution of test data, it is possible to perform anomaly detection with high accuracy. In other words, it is possible to reduce degradation of anomaly detection accuracy.

Note that, while a method for calculating the anomaly degree $A(x;\theta)$ using Normalizing Flow has been described from the first embodiment to the third embodiment, the anomaly degree can be also obtained using other statistical models. For example, it is also possible to use autoencoder (AE) disclosed in Reference non-patent literature 7. The autoencoder is a set of an encoder and a decoder.

(Reference non-patent literature 7: Y. Koizumi, S. Saito, H. Uematsu, Y. Kawachi, and N. Harada, "Unsupervised Detection of Anomalous Sound based on Deep Learning and the Neyman-Pearson Lemma," IEEE/ACM Transactions on Audio, Speech, and Language Processing, Vol. 27-1, pp. 212-224, 2019.)

Technical background of a fourth embodiment to a sixth embodiment of the present invention and each embodiment will be described below.

TECHNICAL BACKGROUND

In a case where an autoencoder is utilized, the anomaly degree can be calculated using the following expression.

[Formula 19]

$$A(x;\theta)=\|x-D(E((x,\theta_E),\theta_D)\|^2 \quad (13)$$

Here, $\|\bullet\|$ indicates a $L_2$ norm, E and D respectively indicate an encoder and a decoder, $\theta_E$ and $\theta_D$ respectively indicate a parameter of the encoder E and a parameter of the decoder D. In other words, $\theta=\{\theta_E, \theta_D\}$.

Both the encoder E and the decoder D can be configured as a neural network. In this case, for example, $\theta$ is learned so that a reconstruction (restoration) error of learning data of normal sound becomes a minimum.

[Formula 20]

$$\theta \leftarrow \operatorname*{argmin}_{\theta} \frac{1}{N} \sum_{i=1}^{N} A(x_i; \theta) \quad (14)$$

Here, $x_i$ is learning data of the i-th normal sound, and N is the number of samples of learning data of normal sound.

To realize adaptive learning using an autoencoder, it is only necessary to configure both or one of the encoder E and the decoder D as a neural network using adaptive batch normalization (AdaBN). In other words, adaptive batch normalization is utilized halfway through calculation of both or one of the encoder E and the decoder D. For example, instead of configuring the encoder E as a three-layer neural network of $E(x;\theta_E)=W_2[\sigma(W_{1X}+b_1)]+b_2$, it is only necessary to configure the encoder E as a neural network which calculates the following expression in which an AdaBN layer is inserted.

[Formula 21]

$$E(x,\theta_E)=W_2\{\text{AdaBN}[\sigma(W_{1X}+b_1)]\}+b_2 \tag{15}$$

Here, $W_1$ and $W_2$ indicate weighting matrices, $b_1$ and $b_2$ indicate bias vectors, σ indicates an activation function. The AdaBN layer is a layer which executes calculation of AdaBN (adaptive batch normalization) as in, for example, expression (8b) and expression (8e).

Fourth Embodiment

A case will be considered where, in a situation where two or more pieces of equipment of the same type exist, anomaly of one piece of equipment (which will be referred to as anomaly detection target equipment) among them is detected. To achieve this, first, an autoencoder (hereinafter, referred to as a first autoencoder) which restores normal sound (hereinafter, referred to as normal sound for learning) emitted from one or more pieces of equipment different from this anomaly detection target equipment is learned from the normal sound emitted from one or more pieces of equipment different from the anomaly detection target equipment (learning phase). Then, an autoencoder (hereinafter, referred to as a second autoencoder) which restores normal sound (hereinafter, referred to as normal sound for adaptive learning) emitted from the anomaly detection target equipment is adaptively learned from the first autoencoder using the normal sound emitted from the anomaly detection target equipment (adaptive learning phase). Then, it is determined whether or not the equipment is abnormal from sound (hereinafter, referred to as anomaly detection target sound) emitted from the anomaly detection target equipment (test phase (anomaly detection phase)).

The autoencoder learning apparatus 400 learns the first autoencoder from the normal sound for learning. The autoencoder adaptive learning apparatus 500 adaptively learns the second autoencoder from the first autoencoder using the normal sound for adaptive learning. The anomaly detection apparatus 600 determines whether or not the equipment is abnormal from the anomaly detection target sound.

Figure 9:
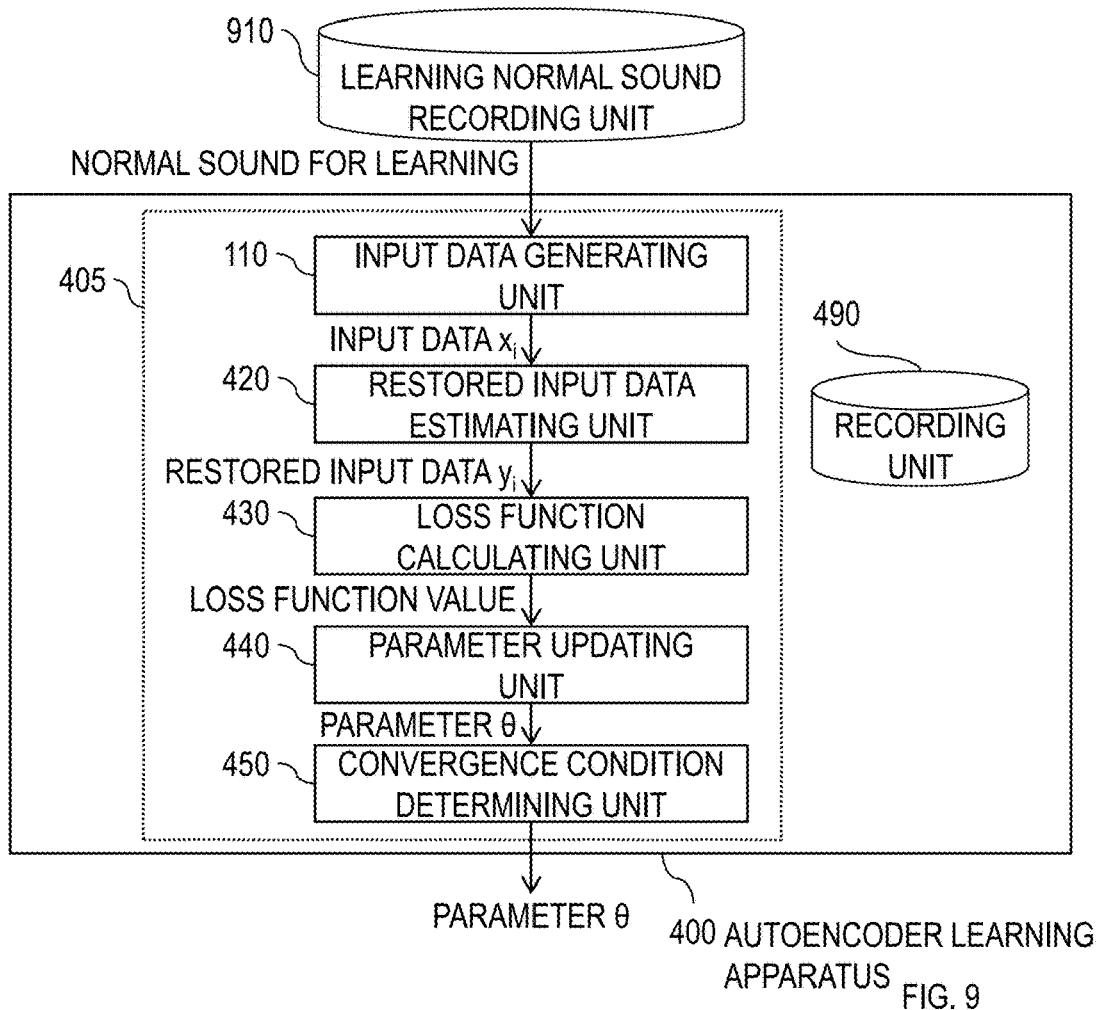
FIG. 9 is a block diagram illustrating an example of a configuration of an autoencoder learning apparatus 400.
Figure 10:
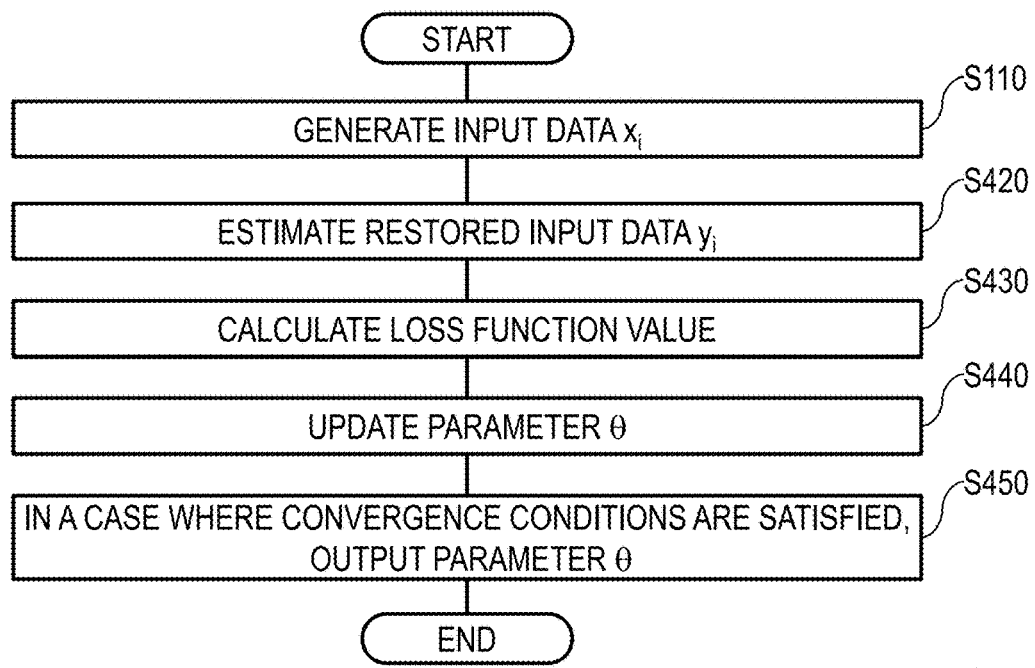
FIG. 10 is a flowchart illustrating an example of operation of the autoencoder learning apparatus 400.

The autoencoder learning apparatus 400 will be described below with reference to FIG. 9 to FIG. 10. FIG. 9 is a block diagram illustrating a configuration of the autoencoder learning apparatus 400. FIG. 10 is a flowchart illustrating operation of the autoencoder learning apparatus 400. As illustrated in FIG. 9, the autoencoder learning apparatus 400 includes the input data generating unit 110, a restored input data estimating unit 420, a loss function calculating unit 430, a parameter updating unit 440, a convergence condition determining unit 450, and a recording unit 490. The recording unit 490 is a component which records information necessary for processing of the autoencoder learning apparatus 400 as appropriate. The recording unit 490, for example, records a parameter θ of the first autoencoder, which is to be learned. As an initial value of the parameter θ, for example, a value generated using a random number is recorded.

The autoencoder learning apparatus 400 is connected to a learning normal sound recording unit 910. In the learning normal sound recording unit 910, normal sound for learning prepared in advance is recorded as learning data. As described above, it is preferable to prepare normal sound for learning as much as possible.

The operation of the autoencoder learning apparatus 400 will be described in accordance with FIG. 10. The input data generating unit 110 generates input data $x_i$ (i=1, ..., N) from normal sound for learning $s_i$ (i=1, ..., N) which is input (S110).

The restored input data estimating unit 420 estimates restored input data $y_i$ (i=1, ..., N) corresponding to the input data $x_i$ from the input data $x_i$ (i=1, ..., N) generated in S110 using the parameter θ of the first autoencoder (S420). Note that the parameter θ used here is a value which is being learned.

The restored input data estimating unit 420 can be realized using a neural network which calculates the restored input data $y_i$ from the input data $x_i$. Note that the calculation expression is as follows.

[Formula 22]

$$y_i=D(E(x_i,\theta_E),\theta_D) \tag{16}$$

This neural network is the first autoencoder (which will be referred to as a neural network NN).

Here, $\theta=\{\theta_E, \theta_D\}$ (where $\theta_E$ and $\theta_D$ respectively indicate a parameter of the autoencoder E and a parameter of the decoder D). Further, at least one of a neural network which configures the encoder E and a neural network which configures the decoder D includes an AdaBN layer. The AdaBN layer refers to a layer which executes calculation of AdaBN (adaptive batch normalization). In other words, the neural network NN includes an AdaBN layer.

The loss function calculating unit 430 calculates a value of the loss function L(θ) to be used for optimization of the parameter θ of the first autoencoder from the restored input data $y_i$ (i=1, ..., N) estimated in S420 (S430). The loss function L(θ) can be set as, for example, an average of an anomaly degree defined using the following expression.

[Formula 23]

$$L(\theta) = \frac{1}{N}\sum_{i=1}^{N} A(x_i;\theta) \tag{17}$$

The parameter updating unit 440 updates the parameter θ of the first autoencoder so as to optimize (minimize) the value of the loss function L(θ) calculated in S430 (S440). For example, it is preferable to use a gradient descent method in updating of the parameter θ.

The convergence condition determining unit 450 determines the convergence conditions set in advance as termination conditions for parameter updating, and, in a case where the convergence conditions are satisfied, outputs the parameter θ updated in S440, while, in a case where the convergence conditions are not satisfied, repeats processing from S110 to S440 (S450). As the convergence conditions, for example, it is possible to employ a condition as to whether the number of times of execution of the processing from S110 to S440 reaches a predetermined number of times.

Note that a component including the input data generating unit 110, the restored input data estimating unit 420, the loss function calculating unit 430, the parameter updating unit 440, and the convergence condition determining unit 450 will be referred to as a learning unit 405. In other words, the learning unit 405 is a component which learns (the parameter θ of) the first autoencoder from the normal sound for learning.

According to the embodiment of the present invention, it is possible to learn the first autoencoder which enables easy adjustment of a difference between distribution of learning data and distribution of test data.

Fifth Embodiment

Figure 11:
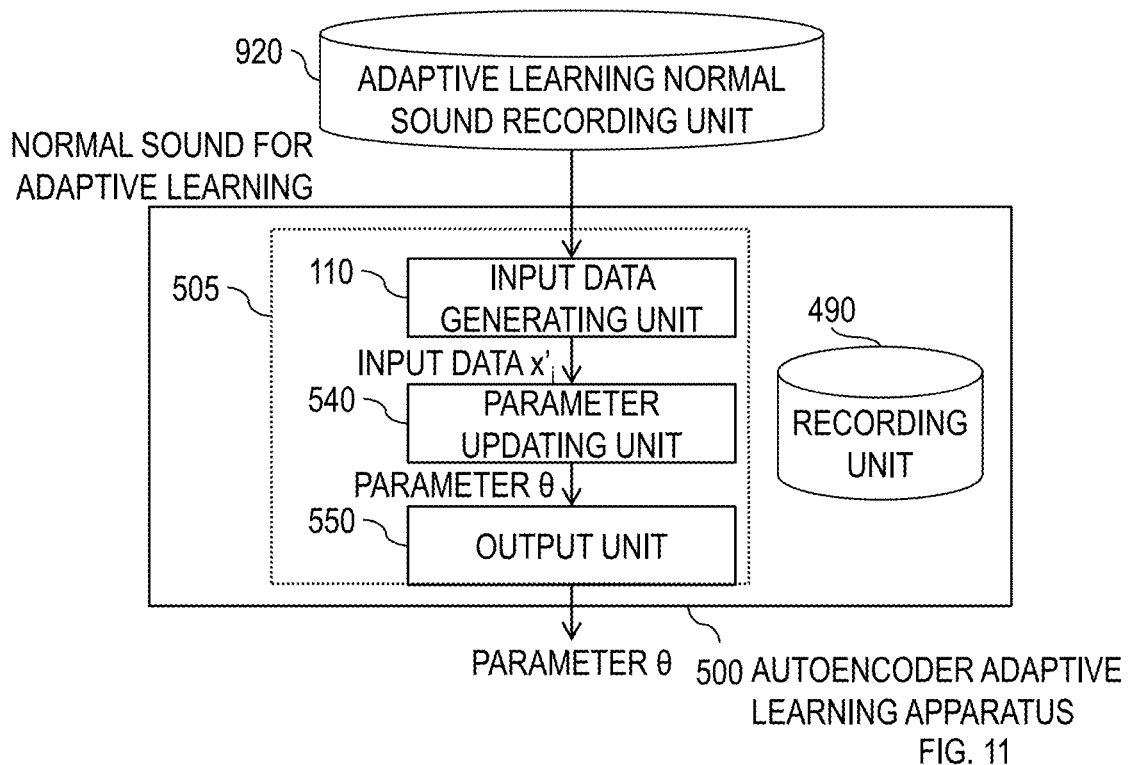
FIG. 11 is a block diagram illustrating an example of a configuration of an autoencoder adaptive learning apparatus 500.
Figure 12:
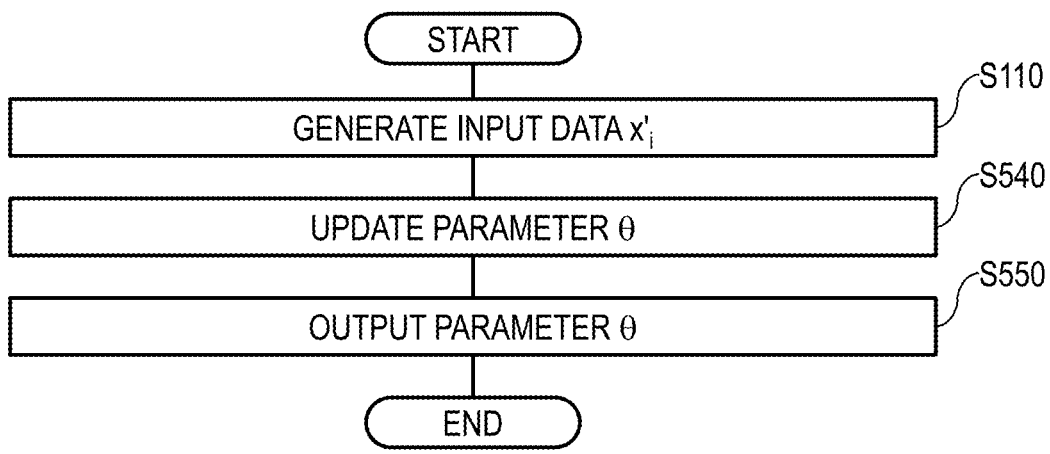
FIG. 12 is a flowchart illustrating an example of operation of the autoencoder adaptive learning apparatus 500.

The autoencoder adaptive learning apparatus 500 will be described below with reference to FIG. 11 to FIG. 12. FIG. 11 is a block diagram illustrating a configuration of the autoencoder adaptive learning apparatus 500. FIG. 12 is a flowchart illustrating operation of the autoencoder adaptive learning apparatus 500. As illustrated in FIG. 11, the autoencoder adaptive learning apparatus 500 includes the input data generating unit 110, a parameter updating unit 540, an output unit 550, and a recording unit 490. The recording unit 490 is a component which records information necessary for processing of the autoencoder adaptive learning apparatus 500 as appropriate. The recording unit 490, for example, records the parameter θ (that is, the learned parameter) of the first autoencoder learned using the autoencoder learning apparatus 400. This learned parameter becomes an initial value of the parameter θ of the second autoencoder.

The autoencoder adaptive learning apparatus 500 is connected to an adaptive learning normal sound recording unit 920. In the adaptive learning normal sound recording unit 920, the normal sound for adaptive learning prepared in advance is recorded as adaptive learning data. As described above, it is only necessary to prepare a relatively small amount of normal sound for adaptive learning compared to an amount of normal sound for learning.

The operation of the autoencoder adaptive learning apparatus 500 will be described in accordance with FIG. 12. The input data generating unit 110 generates input data $x'_i$ (i=1, . . . , M) from the normal sound for adaptive learning $s'_i$ (i=1, . . . , M) which is input (S110). Here, while the number of pieces of normal sound for adaptive learning M is basically an integer which does not exceed the number of pieces of normal sound for learning N, the number of pieces of normal sound for adaptive learning M may be an integer which exceeds the number of pieces of normal sound for learning N.

The parameter updating unit 540 updates the parameter θ of the second autoencoder using the input data $x'_i$ (i=1, . . . , M) generated in S110 (S540). Specifically, for the AdaBN layer which is a layer which calculates adaptive batch normalization and which is included in the first autoencoder (neural network NN), it is only necessary to update an average and a variance used in calculation with an average and a variance of restored input data $y'_i$ calculated from the input data (i=1, . . . , M).

The output unit 550 outputs the parameter θ updated in S540 (S550).

Note that a component including the input data generating unit 110, the parameter updating unit 540, and the output unit 550 will be referred to as an adaptive learning unit 505. In other words, the adaptive learning unit 505 is a component which adaptively learns the second autoencoder from the first autoencoder using the normal sound for adaptive learning.

According to the embodiment of the present invention, it is possible to learn the second autoencoder by adjusting a difference between distribution of learning data and distribution of test data.

Sixth Embodiment

Figure 13:
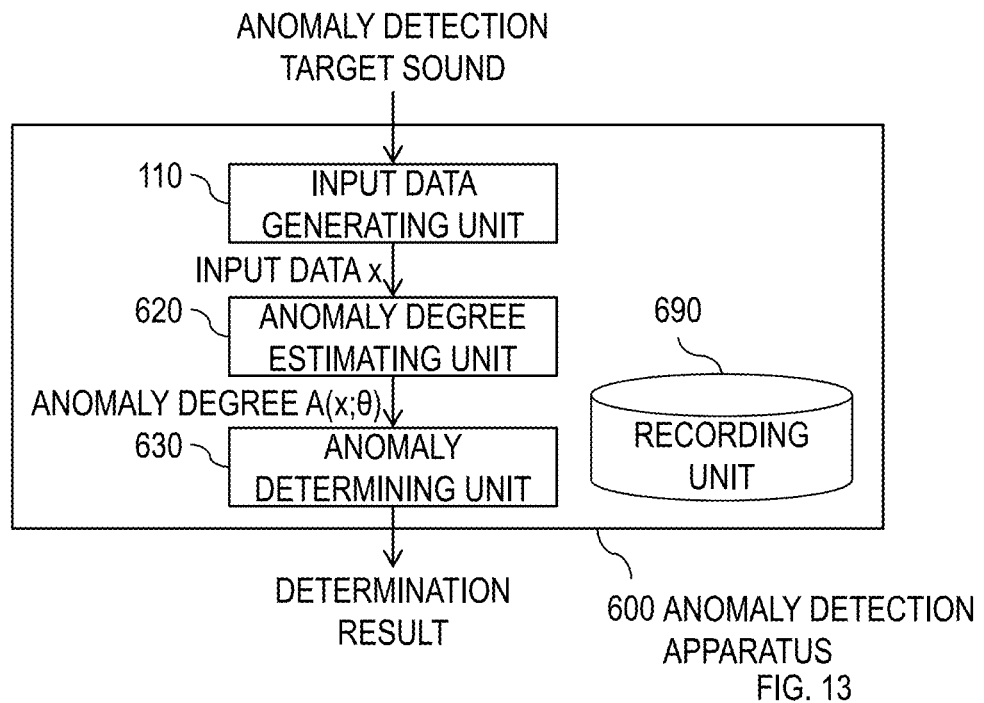
FIG. 13 is a block diagram illustrating an example of a configuration of an anomaly detection apparatus 600.
Figure 14:
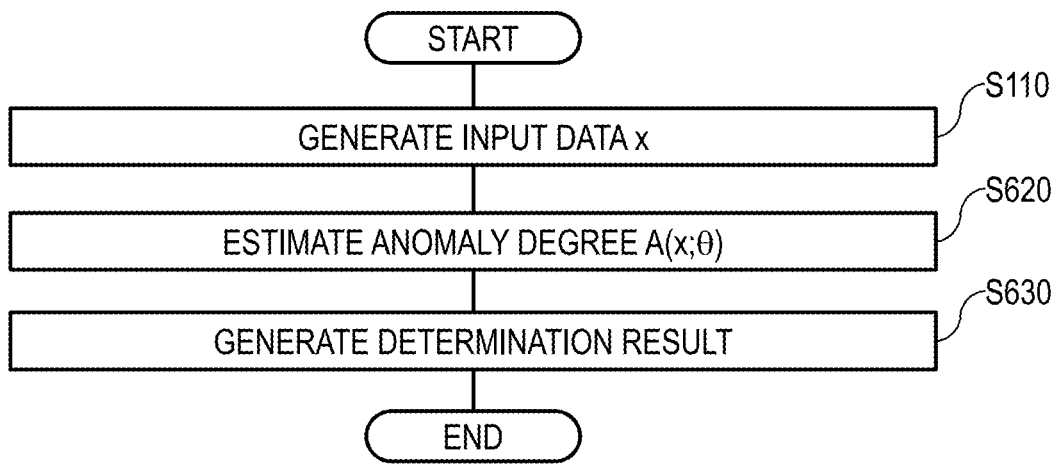
FIG. 14 is as flowchart illustrating an example of operation of the anomaly detection apparatus 600.

The anomaly detection apparatus 600 will be described below with reference to FIG. 13 to FIG. 14. FIG. 13 is a block diagram illustrating a configuration of the anomaly detection apparatus 600. FIG. 14 is a flowchart illustrating operation of the anomaly detection apparatus 600. As illustrated in FIG. 13, the anomaly detection apparatus 600 includes the input data generating unit 110, an anomaly degree estimating unit 620, an anomaly determining unit 630, and a recording unit 690. The recording unit 690 is a component which records information necessary for processing of the anomaly detection apparatus 600 as appropriate. The recording unit 690, for example, records the parameter θ (that is, the learned parameter) of the second autoencoder learned using the autoencoder adaptive learning apparatus 500.

In other words, the anomaly detection apparatus 600 executes anomaly detection using the second autoencoder using this learned parameter as the learned second autoencoder.

The operation of the anomaly detection apparatus 600 will be described in accordance with FIG. 14. The input data generating unit 110 generates input data x from anomaly detection target sound s which is input (S110).

Figure 15:
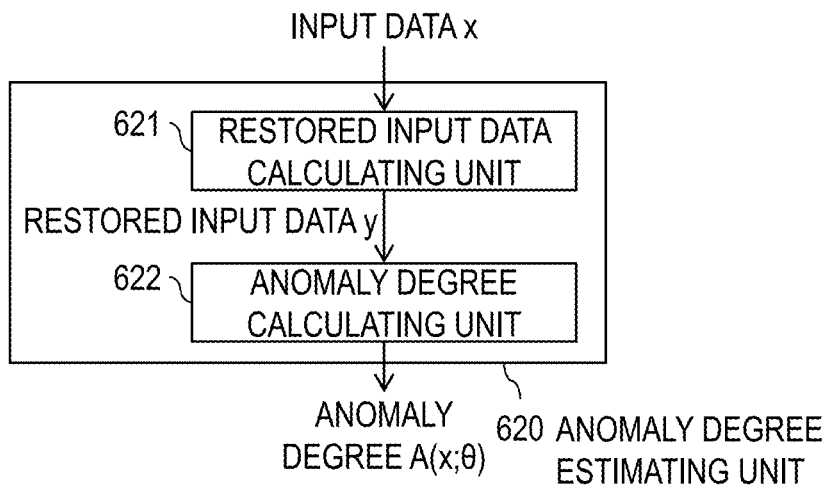
FIG. 15 is a block diagram illustrating an example of a configuration of an anomaly degree estimating unit 620.
Figure 16:
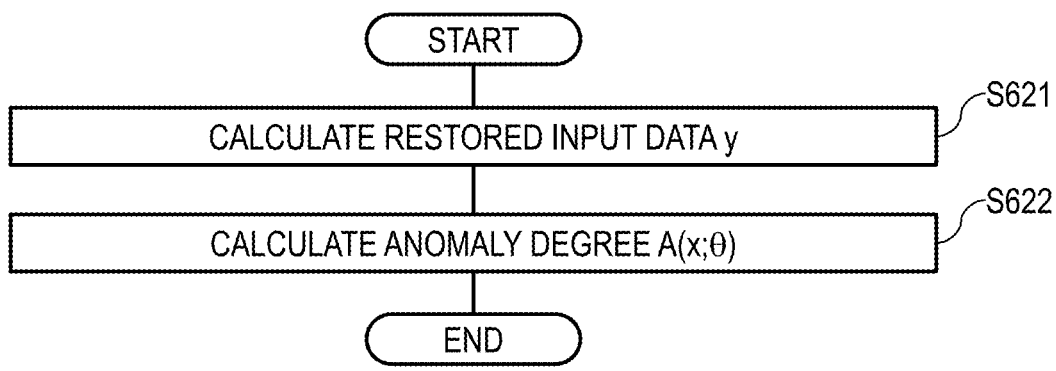
FIG. 16 is a flowchart illustrating an example of operation of the anomaly degree estimating unit 620.

The anomaly degree estimating unit 620 estimates an anomaly degree indicating a degree of anomaly of equipment from the input data x generated in S110 based on the learned second autoencoder (S620). The anomaly degree estimating unit 620 will be described below with reference to FIG. 15 to FIG. 16. FIG. 15 is a block diagram illustrating a configuration of the anomaly degree estimating unit 620. FIG. 16 is a flowchart illustrating operation of the anomaly degree estimating unit 620. As illustrated in FIG. 15, the anomaly degree estimating unit 620 includes a restored input data calculating unit 621 and an anomaly degree calculating unit 622.

The operation of the anomaly degree estimating unit 620 will be described in accordance with FIG. 16. The restored input data calculating unit 621 calculates restored input data y corresponding to the input data x from the input data x generated in S110 (S621). Specifically, it is possible to calculate restored input data y using a neural network in which the learned parameter of the second autoencoder is set as a parameter of the neural network NN.

The anomaly degree calculating unit 622 calculates the anomaly degree A(x;θ) regarding the input data x from the restored input data y calculated in S621 (S622). The anomaly degree can be calculated using, for example, expression (13).

The anomaly degree determining unit 630 generates a determination result indicating whether or not the equipment is abnormal from the anomaly degree A(x;θ) estimated in S620 (S630). For example, it is only necessary to generate a determination result indicating abnormal in a case where R=1, and generate a determination result indicating normal in a case where R=0 using expression (3).

In other words, it can be said that the anomaly detection apparatus 600 includes an anomaly degree estimating unit 620 which estimates an anomaly degree indicating a degree of anomaly of anomaly detection target equipment from sound emitted from the anomaly detection target equipment (anomaly detection target sound) based on association between a first autoencoder which restores normal sound emitted from one or more pieces of equipment different from the anomaly detection target equipment and normal sound emitted from the anomaly detection target equipment (normal sound for adaptive learning). An example of the association is a second autoencoder which restores the normal sound emitted from the anomaly detection target equipment, which is obtained by updating the first autoencoder using the normal sound for adaptive learning.

According to the embodiment of the present invention, by performing anomaly detection using the second autoencoder in which a difference between distribution of learning data and distribution of test data is adjusted, it becomes possible to realize anomaly detection with high accuracy. In other words, it becomes possible to reduce degradation of anomaly detection accuracy.

Technical background from a seventh embodiment to a ninth embodiment of the present invention and each embodiment will be described next.

TECHNICAL BACKGROUND

In the embodiments of the present invention, learning of a data transformer of domain transformation without pair data is performed using Normalizing Flow. Normalizing Flow is characterized in that learning is easier than GAN, which results in enabling more stable learning than a GAN-based domain transformation technique (StarGAN) without pair data in related art.

Related arts used in the embodiment of the present invention will be described below.

<<Normalizing Flow>>

Normalizing Flow is a method for obtaining distribution which approximates the probability distribution p(x) regarding data generation.

It is assumed that $\{f_i(z)\}_{i=1}^K$ is K transformations having inverse transformations (where $f_i(z): R^D \to R^D$, R is a set of real numbers, D is an integer of 1 or greater, and K is an integer of 1 or greater). Further, it is assumed that $f_i^{-1}(z)$ (i=1, . . . , K) is an inverse transformation of $f_i(z)$.

In Normalizing Flow, it is considered that latent variables $\{z_{0,i}\}_{i=1}^N$ respectively corresponding to the set $\{x_i\}_{i=1}^N$ of N pieces of input data exist, and the input data $x_i$ is obtained by transforming the corresponding latent variable $z_{0,i}$ using expression (21) using K transformations $\{f_i(z)\}_{i=1}^K$ and the latent variable $z_0$ of x.

[Formula 24]

$$x = f_K(f_{K-1}(\ldots(f_1(z_0))\ldots)) \qquad (21)$$

In other words, the following expression holds for i=1, . . . , K.

[Formula 25]

$$x = f_K(f_{K-1}(\ldots(f_1(z_0))\ldots)) \qquad (21)'$$

Note that $z_1 = f_1(z_0), z_2 = f_2(z_1), \ldots, x = f_K(z_{K-1})$.

Further, it is assumed that the latent variable $\{z_{0,i}\}_{i=1}^N$ is generated from the probability distribution $q_0(z_0)$ such as, for example, isotropic Gaussian distribution, with which it is easy to perform Monte Carlo sampling. At this time, the probability distribution $q(x;\theta)$ (where x is a variable indicating input data) with which a set of the input data $\{x_i\}_{i=1}^N$ complies can be expressed in the following form.

[Formula 26]

$$q(x;\theta) = q_0(z_0)|\det(\partial f_K(z_{K-1};\theta_K)/(\partial z_{K-1})||\det(\partial f_{K-1}(z_{K-2};\theta_{K-1})/(\partial z_{K-2})| \ldots |\det(\partial f_1(z_0;\theta_1)/\partial z_0)| \qquad (22)$$

Here, $z_0 = f_1^{-1}(f_2^{-1}(\ldots(f_K^{-1}(x)))\ldots))$. Further, $\{\theta_i\}_{i=1}^K$ is a parameter corresponding to the transformation $\{f_i(z)\}_{i=1}^K$, and $\theta = [\theta_1^T, \theta_2^T, \ldots, \theta_K^T]^T$.

Note that the probability distribution $q_0(z_0)$ is not limited to distribution with which it is easy to perform Monte Carlo sampling, and only requires to be distribution with which it is easy to perform strict probability density estimation. Examples of the distribution with which it is easy to perform strict probability density estimation can include a probability distribution p(x) which satisfies the following conditions.

(Condition 1) A non-negative function g(x) (≥0) on $R^D$ exists for the probability distribution p(x), and p(x)=g(x)/∫g(x)dx for arbitrary x∈$R^D$.

(Condition 2) It is easy to calculate ∫g(x)dx for the function g(x).

Examples of the function which satisfies Condition 2 can include Gaussian distribution. On the other hand, examples of the function which does not satisfy Condition 2 can include $g(x) = \exp(\sin(x) - x^2)$.

In Normalizing Flow, a parameter θ of the probability distribution $q(x;\theta)$ is learned using a set of input data $\{x_i\}_{i=1}^N$. Then, the original probability distribution p(x) regarding data generation is approximated by the probability distribution $q(x;\theta)$ using the parameter (referred to as the learned parameter) θ obtained through learning.

In Normalizing Flow, it is possible to use various kinds of transformation as the transformation $\{f_i(z)\}_{i=1}^K$. For example, it is possible to use Batch Normalization, Leaky ReLU (Rectified Linear Unit), or the like, disclosed in Reference non-patent Literature 3. Further, it is also possible to use the following linear transformation disclosed in Reference non-patent literature 4.

[Formula 27]

$$f(z) = LUz \qquad (23)$$

Here, L, U∈$R^{D \times D}$ are respectively a lower triangular matrix and an upper triangular matrix. This transformation is characterized in that, because an absolute value $|\det(\partial f(z;\theta)/\partial z)|$ of a Jacobian determinant can be calculated using an absolute value (that is, $|\Pi_{i=1}^D L_{ii} U_{ii}|$) of a product of diagonal elements of L and U, it is possible to easily calculate a probability density $q(x;\theta)$ of the input data x (in other words, it is possible to reduce calculation cost of the probability density $q(x;\theta)$ of the input data x) (see expression (22)).

Batch Normalization BN: x→y (x, y∈$R^D$) will be briefly described below. In Batch Normalization BN, after adjustment is performed so that an average of elements of respective dimensions of the set $\{x_i\}_{i=1}^N$ of the input data becomes 0 and a variance becomes 1, scale transformation and shift transformation are performed. Specifically, $y_i = BN(x_i)$ is calculated using the following expression.

[Formula 28]

$$m = \frac{1}{N}\sum_{i=1}^N x_i \qquad (24a)$$

$$s^2 = \frac{1}{N}\sum_{i=1}^N (x_i - m)^2 \qquad (24b)$$

$$\hat{x}_i = \frac{x_i - m}{\sqrt{s^2 + \varepsilon}} \qquad (24c)$$

$$y_i = \gamma \hat{x}_i + \beta \qquad (24d)$$

Here, γ and β are respectively a scale transformation parameter, and a shift transformation parameter, and both are parameters to be learned. Further, ε is a non-negative real number, and, it is only necessary to set a positive real number as ε in a case where it is desired to avoid division by zero, and set zero as c in a case where it is not necessary to avoid division by zero.

Note that, to clearly specify the scale transformation parameter γ and the shift transformation parameter β, there is also a case where BN(●) is expressed as $BN_{\gamma\beta}$(●).

Not all of K transformations used in Normalizing Flow have to be transformations of the same type. Therefore, for example, it is also possible to combine some kinds of transformations such that a transformation $f_1(z)$ is batch normalization, and a transformation $f_2(z)$ is linear transformation.

<<AdaBN (Adaptive Batch Normalization)>>

Domain adaptation is a technique of adjusting a learned model so that, in a case where distribution of learning data to be used for model learning is different from distribution of test data which is a target of processing using the learned model, accuracy of the processing using the learned model does not degrade due to a difference between the distribution. Here, a set of learning data and a set of test data are domains, and they are sometimes respectively referred to as a domain for learning and a domain for test.

While there are various methods for domain adaptation which can be combined with a deep neural network (DNN), here, adaptive batch normalization will be described (see Reference non-patent literature 5). Adaptive batch normalization is a method in which calculation of an average and a variance and adjustment of an average and a variance in batch normalization (see expressions (24a) to (24d)) are performed for each domain. In other words, calculation using the expressions (24a) to (24c) is performed for each piece of data in the same domain. In actual test, an amount of statistics (average and variance) is calculated for a set $\{x_i\}_{i=1}^N$ of the input data of the domain for test, and a processing result $y_i$ is output using the expression (24c) and the expression (24d) using the amount of statistics. Note that, in a case where transformation is adaptive batch normalization, there is a case where transformation is expressed as AdaBN: x→y (x, y∈$R^D$).

<<AdaFlow>>

AdaFlow is a method in which adaptive batch normalization is introduced into Normalizing Flow. Specifically, at least one inverse transformation $f_{i\_0}^{-1}(z)$ of K transformations $\{f_i(z)\}_{i=1}^K$ to be used in Normalizing Flow is adaptive batch normalization. Note that, in calculation of adaptive batch normalization, scale transformation and shift transformation, that is, calculation in the expression (24d) may be omitted. In other words, it is also possible to express that the inverse transformation $f_{i\_0}^{-1}(z)$ is adaptive batch normalization in which γ=1 and β=0.

If learning is performed using AdaFlow, it becomes possible to generate a probability distribution of a plurality of domains from one learned model. Further, it becomes possible to perform data transformation among a plurality of domains.

AdaFlow will be specifically described below. AdaFlow is a neural network which transforms the input data x generated from learning data into latent variables $z_0(\sim q(z_0))$ regarded as being generated in accordance with the probability distribution $q_0(z_0)$. Here, a case where five transformations $\{f_i(z)\}_{i=1}^5$ are used will be described. In other words, $z_0$ can be obtained as $z_0 = f_1^{-1}(f_2^{-1}(f_3^{-1}(f_4^{-1}(f_5^{-1}(x)))))$.

The above-described five transformations $\{f_i(z)\}_{i=1}^5$ will be defined using the following expression. Note that, for convenience sake, instead of the transformation $f_i$ being indicated, the inverse transformation $f_i^{-1}$ of the transformation $f_i$ is indicated (where $z_4=f_5^{-1}(x)$, $z_3=f_4^{-1}(z_4)$, $z_2=f_3^{-1}(z_3)$, $z_1=f_2^{-1}(z_2)$, $z_0=f_1^{-1}(z_1)$).

[Formula 29]

$$f_5^{-1}(x) = L_5 D_5 U_5 x \tag{25a}$$

$$f_4^{-1}(z_4) = AdaBN_{\gamma 4 \beta 4}(z_4) \tag{25b}$$

$$f_3^{-1}(z_3) = LeakyReLU(z_3) = \max(z_3, \alpha_3 z_3) \tag{25c}$$

$$f_2^{-1}(z_2) = L_2 D_2 U_2 z_2 \tag{25d}$$

$$f_1^{-1}(z_1) = AdaBN_{\gamma 1 \beta 1}(z_1) \tag{25e}$$

Here, $L_2, L_5 \in R^{D \times D}$ is a lower triangular matrix whose diagonal element is 1, and all elements $L_{2,ij}, L_{5,ij}$ (i≥j) other than an upper triangular portion are learning target parameters (that is, a parameter $\theta_2$ or a parameter $\theta_5$). $D_2, D_5 \in R^{D \times D}$ is a diagonal matrix, and diagonal elements $D_{2,ij}, D_{5,ij}$ (i=j) are learning target parameters (that is, a parameter $\theta_2$ or a parameter $\theta_5$). $U_2, U_5 \in R^{D \times D}$ is an upper triangular matrix whose diagonal element is 1, and all elements (i≤j) other than a lower triangular portion are learning target parameters (that is, a parameter $\theta_2$ or a parameter $\theta_5$). Further, $\alpha_3$ (≥0) is a parameter of LeakyReLU, and may be set as a hyper parameter, or may be set as a learning target parameter (that is, a parameter $\theta_3$) (in a case where $\alpha_3$ is set as a learning target, ReLU is called Parametric ReLU (Reference non-patent literature 6)). Further, $AdaBN_{\gamma\_4\beta\_4}$(●) and $AdaBN_{\gamma\_1\beta\_1}$(●) are above-described adaptive batch normalization, and $\gamma_1, \beta_1, \gamma_4, \beta_4$ are learning target parameters (that is, a parameter $\theta_1$ or a parameter $\theta_4$).

Further, absolute values of Jacobian determinants of the transformations $\{f_i(z)\}_{i=1}^5$ are respectively calculated using the following expression (where $x=f_5(z_4)$, $z_4=f_4(z_3)$, $z_3=f_3(z_2)$, $z_2=f_2(z_1)$, $z_1=f_1(z_0)$).

[Formula 30]

$$|\det(\partial f_5(z_4)/\partial z_4)| = 1/|\Pi_{i=1}^D D_{5,ii}| \tag{26a}$$

$$|\det(\partial f_4(z_3)/\partial z_3)| = \sqrt{s_4'^2 + \varepsilon}/\gamma_4 \tag{26b}$$

$$|\det(\partial f_3(z_2)/\partial z_2)| = 1/\alpha_3^\delta \tag{26c}$$

$$|\det(\partial f_2(z_1)/\partial z_1)| = 1/|\Pi_{i=1}^D D_{2,ii}| \tag{26d}$$

$$|\det(\partial f_1(z_0)/\partial z_o)| = \sqrt{s_1'^2 + \varepsilon}/\gamma_1 \tag{26e}$$

Here, $s_4'$ is a standard deviation of $z_4$ (corresponding to the input data x generated from learning data), δ is the number of elements below zero among $z_3$ (corresponding to the input data x generated from learning data), and $s_1'$ is a standard deviation of $z_1$ (corresponding to the input data x generated from learning data). Note that absolute values $|\det(\partial f_4(z_3)/\partial z_3)|$, $|\det(\partial f_1(z_0)/\partial z_0)|$ of Jacobian determinants for the transformations $f_4$ and $f_1$ are expressed using absolute values of Jacobian determinants upon deduction instead of upon learning (that is, upon processing using the learned model).

Further, as described above, it is assumed that the probability distribution $q_0(z_0)$ is a probability distribution with which it is easy to perform strict probability density estimation. For example, if Gaussian distribution N(0, I) in which an average is 0 and a variance is an identity matrix I is set as the probability distribution $q_0(z_0)$, the probability distribution $q_0(z_0)$ can be expressed using the following expression.

[Formula 31]

$$q_0(z_0) = -(2\pi)^{-D/2} \exp(-\|z_0\|_2^2) \tag{27}$$

Therefore, it can be understood that, by setting the probability distribution of the input data x generated from the learning data as $q_1(x;\theta)$ and using expression (22), it is possible to calculate a probability density $q_1(x_i;\theta)$ of input data $x_i$ from the probability density $q_0(z_{0,i})$ of the latent variable $z_{0,i}$.

Subsequently, a learning method of the parameter $\theta$ will be described. In a similar manner to conventional learning of a neural network, it is possible to perform learning using, for example, a gradient descent method, Momentum SGD (Stochastic Gradient Descent), ADAM (Adaptive Moment Estimation) or combination thereof, using the loss function $L(\theta)$. In a case where Normalizing Flow is used, an average of negative log likelihoods defined using the following expression is often used as the loss function $L(\theta)$.

[Formula 32]

$$L(\theta) = -1/N \sum_{i=1}^{N} \log q(x_i;\theta) \tag{28}$$

Note that it is possible to use a mini batch learning method which is performed in units of a set of learning data called mini batch in the above-described learning. Here, mini batch refers to a plurality of pieces of learning data randomly selected from all learning data. A value of the loss function $L(\theta)$ is calculated for each mini batch.

Seventh Embodiment

The probability distribution learning apparatus 1100 learns a model parameter $\theta$ of a neural network which transforms the input data x generated from data of P types of domains $D_j$ (j=1, . . . , P) (hereinafter, referred to as domain data) into a latent variable $z_0(\sim q(z_0))$ regarded as being generated in accordance with the probability distribution $q_0(z_0)$. It is possible to obtain the probability distribution $q(x;\theta)$ of the input data x from the probability distribution $q_0(z_0)$ using this model parameter $\theta$ (see expression (22)). Here, it is assumed that the domain $D_j$ includes $N_j$ pieces of domain data. Therefore, if the number of pieces of domain data included in a union of P types of domains is N, $N=\sum_j N_j$.

Figure 17:
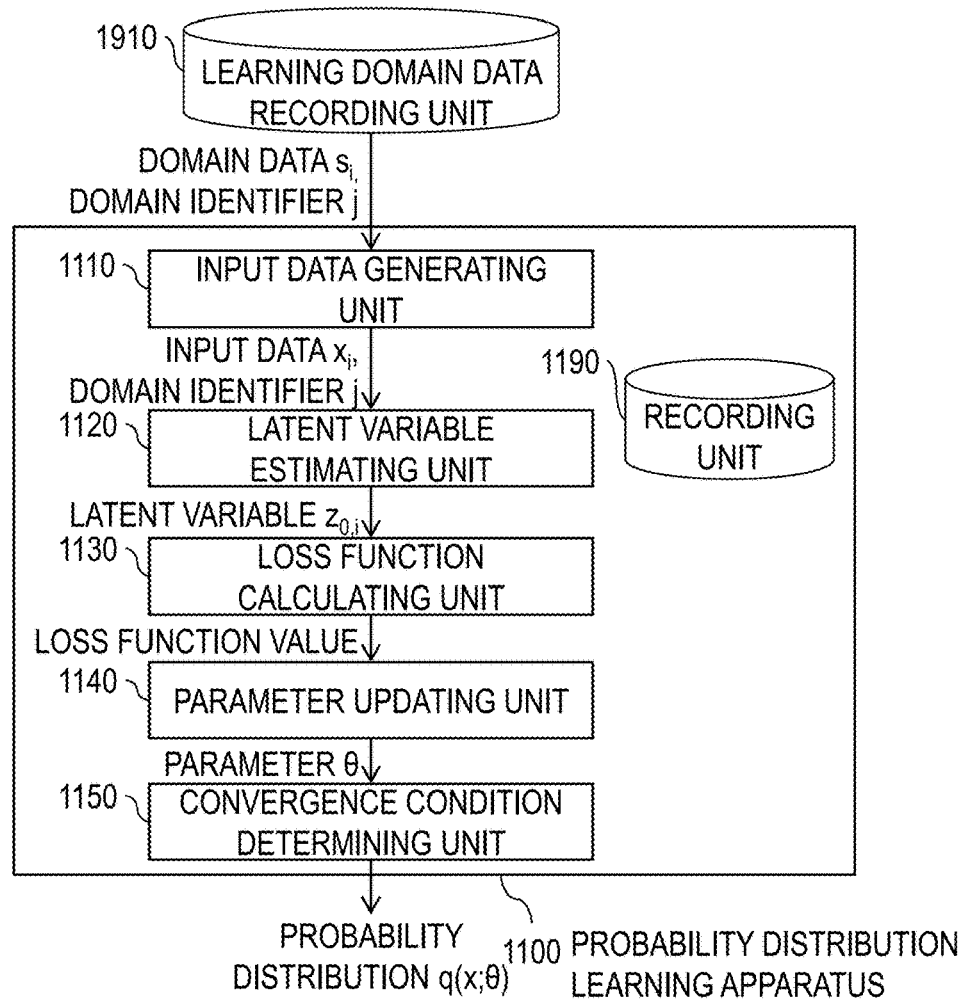
FIG. 17 is a block diagram illustrating an example of a configuration of a probability distribution learning apparatus 1100.
Figure 18:
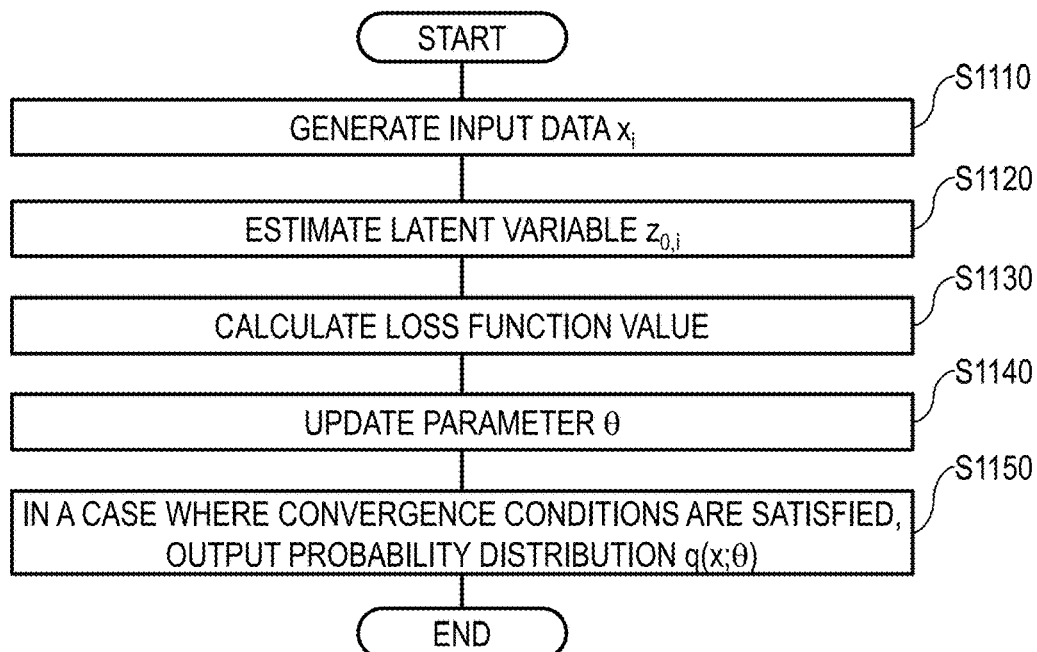
FIG. 18 is a flowchart illustrating an example of operation of the probability distribution learning apparatus 1100.

The probability distribution learning apparatus 1100 will be described below with reference to FIG. 17 to FIG. 18. FIG. 17 is a block diagram illustrating a configuration of the probability distribution learning apparatus 1100. FIG. 18 is a flowchart illustrating operation of the probability distribution learning apparatus 1100. As illustrated in FIG. 17, the probability distribution learning apparatus 1100 includes an input data generating unit 1110, a latent variable estimating unit 1120, a loss function calculating unit 1130, a parameter updating unit 1140, a convergence condition determining unit 1150, and a recording unit 1190. The recording unit 1190 is a component which records information necessary for processing of the probability distribution learning apparatus 1100 as appropriate. The recording unit 1190 records, for example, a parameter $\theta$ of the probability distribution $q(x;\theta)$ of the input data x. As an initial value of the parameter $\theta$, for example, a value generated using a random number is recorded.

The probability distribution learning apparatus 1100 is connected to a learning domain data recording unit 1910. In the learning domain data recording unit 1910, a tuple $(s_i, j)$ of domain data $s_i$ (i=1, . . . , N) prepared in advance and a domain identifier j for identifying a domain in which the domain data $s_i$ is included is recorded as learning data. Note that $(s_i, j)$ will be also referred to as domain data for learning.

The operation of the probability distribution learning apparatus 1100 will be described in accordance with FIG. 18. In S1110, the input data generating unit 1110 receives domain data for learning $(s_i, j)$ (i=1, . . . , N, $s_i$ is domain data, and j is a domain identifier of a domain in which $s_i$ is included) which is input as input, generates input data $x_i$ (i=1, . . . , N) from the domain data $s_i$ and outputs a tuple of the input data $x_i$ and the domain identifier j. Any method with which domain data can be restored from input data may be used as a method for generating input data from domain data. For example, in a case where domain data is an image or sound, it is preferable to use predetermined feature amounts with which an image or sound which is an extraction source can be restored, as the input data $x_i$ generated from the domain data $s_i$.

In S1120, the latent variable estimating unit 1120 receives the tuple of the input data $x_i$ (i=1, . . . , N) and the domain identifier j of the domain in which the domain data $s_i$ is included, generated in S1110, as input, estimates a latent variable $z_{0,i}$ (i=1, . . . , N) corresponding to the input data $x_i$ from the input data $x_i$ (i=1, . . . , N) using the parameter $\theta$ of the probability distribution $q(x;\theta)$ and outputs the latent variable $z_{0,i}$ (i=1, . . . , N). Note that the parameter $\theta$ used here is a value which is being learned.

Here, it is assumed that a variable x of the probability distribution $q(x;\theta)$ is a variable indicating input data generated from domain data of P types of domains $D_j$, and the variable x is expressed as $x=f_K^{-1}(f_{K-1}^{-1}(\ldots(f_1(z_0))\ldots))$ using transformations $f_i$ (i=1, . . . , K, K is an integer of 1 or greater, and inverse transformations $f_i^{-1}$ exist for the transformations $f_i$) and the latent variable $z_0$.

Therefore, the latent variable $z_{0,i}$ corresponding to the input data $x_i$ is provided using the following expression.

[Formula 33]

$$z_{0,i} = f_1^{-1}(f_2^{-1}(\ldots(f_K^{-1}(x_i))\ldots)) \tag{29}$$

Further, it is assumed that the latent variable $z_{0,i}$ (i=1, . . . , N) is generated in accordance with the probability distribution $q_0(z_0)$ of the latent variable $z_0$. However, the probability distribution $q_0(z_0)$ has characteristics that it is easy to perform strict probability density estimation.

Therefore, the probability distribution $q(x;\theta)$ can be expressed using the following expression using the probability distribution $q_0(z_0)$.

[Formula 34]

$$q(x;\theta) = q_0(z_0)|\det(\partial f_K(z_{K-1};\theta_K(\partial z_{K-1})||\det(\partial f_{K-1}(z_{K-2};\theta_{K-1})/(\partial z_{K-2})|\ldots|\det(\partial f_1(z_0;\theta_1)/\partial z_0)| \tag{22}$$

Here, $\theta_i$ is a parameter corresponding to the transformation $f_i$, and $\theta = [\theta_1^T, \theta_2^T, \ldots, \theta_K^T]^T$.

The latent variable estimating unit 1120 can be realized using a neural network NN which calculates the latent variable $z_0$ from the input data x. Note that a calculation expression of the latent variable $z_0$ is as follows.

[Formula 35]

$$z_0 = f_1^{-1}(f_2^{-1}(\ldots(f_K^{-1}(x))\ldots)) \tag{29'}$$

In other words, the neural network NN receives the input data x as input, proceeds with calculation sequentially from the inverse transformations $f_K^{-1}$, $f_{K-1}^{-1}$, ..., $f_2^{-1}$, $f_1^{-1}$, and finally outputs the latent variable $z_0$.

At least one inverse transformation $f_{i\_0}^{-1}$ of the above-described transformations $f_i$ (i=1, ..., K) (where $i_0$ is an integer which satisfies $1 \leq i_0 \leq K$) is made adaptive batch normalization.

Further, an inverse transformation $f_{i\_1}^{-1}$ of a transformations $f_{i\_1}$ (where $i_1$ is an integer which satisfies $1 \leq i_1 \leq K$) included in the transformations $f_i$ (i=1, ..., K) may be linear transformation, and a matrix corresponding to the linear transformation may be expressed as a product of a lower triangular matrix and an upper triangular matrix, or a product of a lower triangular matrix, a diagonal matrix and an upper triangular matrix.

As a specific example of the transformations $f_i$ (i=1, ..., K), it is possible to use five transformations whose inverse transformations can be expressed using expression (25a) to expression (25e) assuming that, for example, K=5.

Further, because the latent variable estimating unit 1120 calculates an average and a variance of the input data $z_{i\_0,i}(=f_{i\_0-1}^{-1}(f_{i\_0-2}^{-1}(\ldots(f_K^{-1}(x_i))\ldots)))$ to be input to the inverse transformation $f_{i\_0}^{-1}$, which is calculated from input data $x_i$ (i=1, ..., N), for each domain, that is, an average and a variance used for calculation of the inverse transformation $f_{i\_0}^{-1}$ which is adaptive batch normalization, $(z_{i\_0,i}, j)$ (where j is a domain identifier of domain data $s_i$ which is a generation source of the input data $x_i$) is recorded in the recording unit 1190. Hereinafter, an average and a variance of the domain $D_j$ of the input data to be input to the inverse transformation $f_{i\_0}^{-1}$ are respectively expressed as $m_{i\_0,j}$ and $s_{i\_0,j}^2$. Note that, as will be described later, the average $m_{i\_0,j}$ and the variance $s_{i\_0,j}^2$ are calculated by the convergence condition determining unit 1150.

In S1130, the loss function calculating unit 1130 receives the latent variable $z_{0,i}$ (i=1, ..., N) estimated in S1120 as input, calculates a value of the loss function $L(\theta)$ to be used for optimization of the parameter $\theta$ of the probability distribution $q(x;\theta)$ from the latent variable $z_{0,i}$ (i=1, ..., N) and outputs the value of the loss function $L(\theta)$. The loss function $L(\theta)$ can be, for example, defined as an average of negative log likelihoods as in expression (28). At this time, while it is necessary to calculate the probability density $q(x_i;\theta)$ of the input data $x_i$ (i=1, ..., N), the probability density $q(x_i;\theta)$ of the input data $x_i$ can be calculated using the probability density $q_0(z_{0,i})$ of the latent variable $z_{0,i}$ corresponding to the input data $x_i$. For example, in a case where the probability distribution $q_0(z_0)$ is Gaussian distribution $N(0, I)$, the probability density $q_0(z_{0,i})$ of the latent variable $z_{0,i}$ can be calculated using the following expression.

[Formula 36]

$$q_0(z_{0,i}) = (2\pi)^{-D/2} \exp(-\|z_{0,1}\|_2^2) \quad (27)'$$

So it is possible to calculate the probability density $q(x_i;\theta)$ of the input data $x_i$ from the above-described probability density $q_0(z_{0,i})$ of the calculated latent variable $z_{0,i}$ using expression (22).

In S1140, the parameter updating unit 1140 receives the value of the loss function $L(\theta)$ calculated in S1130 as input, and updates the parameter $\theta$ of the probability distribution $q(x;\theta)$ so as to optimize (minimize) the value of the loss function $L(\theta)$, and outputs the parameter $\theta$. For example, a gradient descent method is preferably used in updating of the parameter $\theta$.

In S1150, the convergence condition determining unit 1150 determines the convergence conditions set in advance as termination conditions of parameter updating, and, in a case where the convergence conditions are satisfied, outputs the probability distribution $q(x;\theta)$ using the parameter $\theta$ (this parameter will be referred to as the learned parameter) updated in S1140. At this time, the convergence condition determining unit 1150 calculates the average $m_{i\_0,j}$ and the variance $s_{i\_0,j}^2$ (j=1, ..., P) of the domain $D_{j\_0}$ of the input data to be input to the inverse transformation $f_{i\_0}^{-1}$ using $(z_{i\_0,i}, j)$ (i=1, ..., N) recorded in S1120, and outputs the average $m_{i\_0,j}$ and the variance $s_{i\_0,j}^2$ (j=1, ..., P). Meanwhile, in a case where the convergence conditions are not satisfied, the convergence condition determining unit 1150 repeats processing from S1110 to S1140. As the convergence conditions, for example, it is possible to employ a condition as to whether the number of times of execution of processing from S1110 to S1140 reaches a predetermined number of times. Note that it is also possible to output the parameter $\theta$ updated in S1140 and the inverse transformations $f_K^{-1}(x; \theta_K)$, $f_{K-1}^{-1}(z_{K-1}; \theta_{K-1})$, ..., $f_2^{-1}(z_2; \theta_2)$, $f_1^{-1}(z_1; \theta_1)$. Hereinafter, the average $m_{i\_0,j}$ and the variance $s_{i\_0,j}^2$ of the domain $D_j$ of the input data to be input to the inverse transformation $f_{i\_0}^{-1}$ will be referred to as an amount of statistics calculated from the domain data of the domain $D_j$.

According to the embodiment of the present invention, it is possible to learn the probability distribution $q(x;\theta)$ of the input data x generated from domain data of P types of domains $D_j$. By performing learning using AdaFlow based on Normalizing Flow, it becomes possible to stably perform learning without pair data.

Eighth Embodiment

The data transformation apparatus 1200 transforms domain data of a domain $D_{j\_0}$ into domain data of a domain $D_{j\_1}$ (where $j_0$, $j_1$ are integers which satisfy $1 \leq j_0, j_1 \leq P$, and $j_0 \neq j_1$) using the learned model parameter $\theta$ learned at the probability distribution learning apparatus 1100, and the average $m_{i\_0,j}$ and the variance $s_{i\_0,j}^2$ (j=1, ..., P) of the domain $D_j$ of the input data to be input to the inverse transformation $f_{i\_0}^{-1}$. Hereinafter, the domain $D_{j\_0}$ will be referred to as a transformation source domain, and the domain $D_{j\_1}$ will be referred to as a transformation destination domain.

Figure 19:
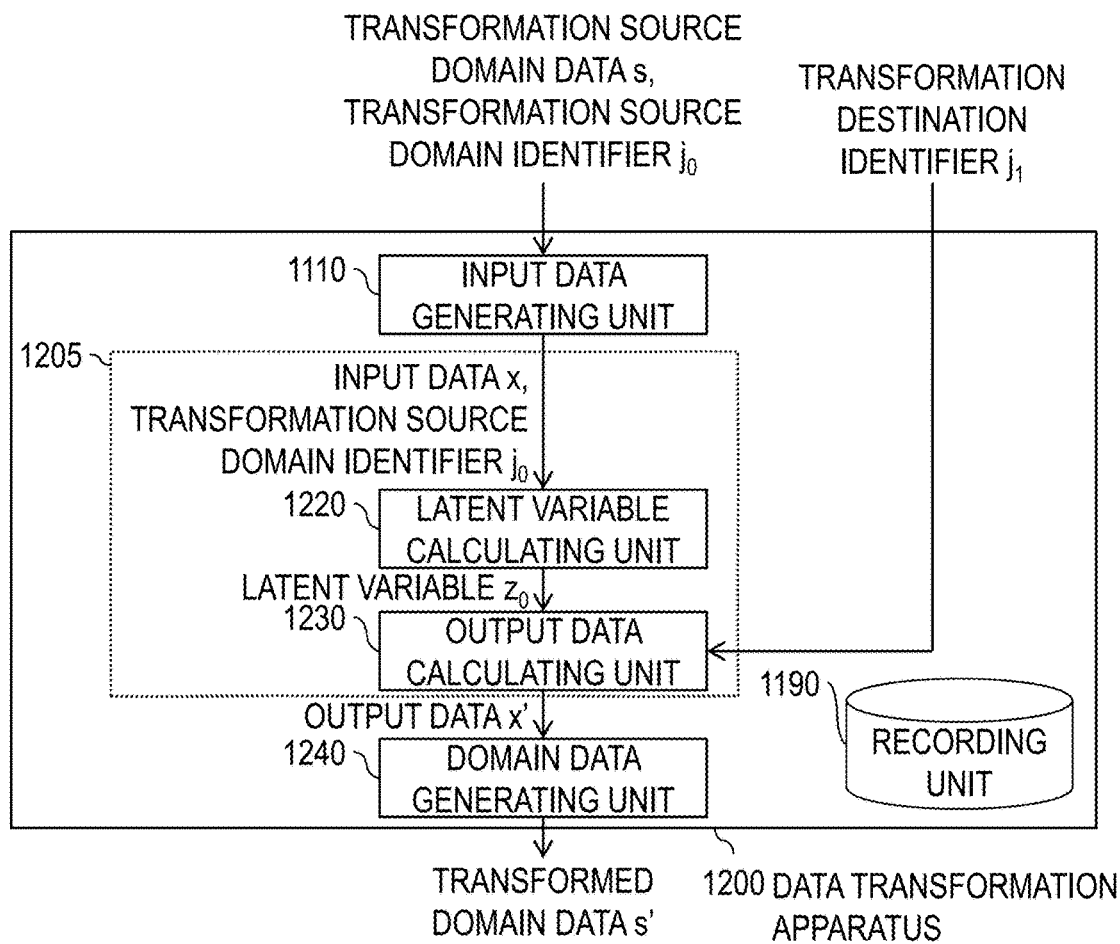
FIG. 19 is a block diagram illustrating an example of a configuration of a data transformation apparatus 1200.
Figure 20:
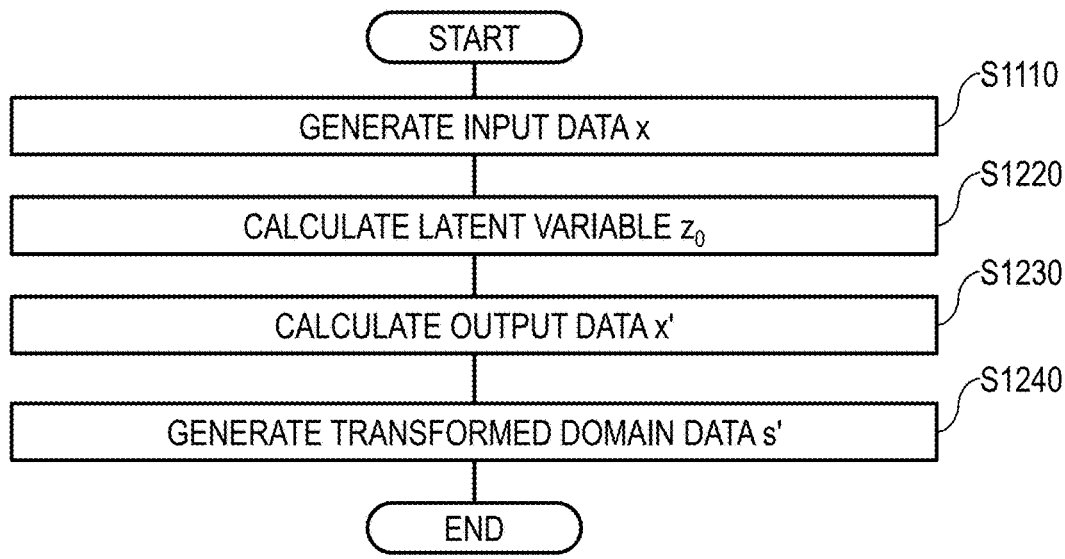
FIG. 20 is a flowchart illustrating an example of operation of the data transformation apparatus 1200.

The data transformation apparatus 1200 will be described below with reference to FIG. 19 and FIG. 20. FIG. 19 is a block diagram illustrating a configuration of the data transformation apparatus 1200. FIG. 20 is a flowchart illustrating operation of the data transformation apparatus 1200. As illustrated in FIG. 19, the data transformation apparatus 1200 includes the input data generating unit 1110, a latent variable calculating unit 1220, an output data calculating unit 1230, a domain data generating unit 1240, and the recording unit 1190. The recording unit 1190 is a component which records information necessary for processing of the data transformation apparatus 1200 as appropriate. The recording unit 1190, for example, records the parameter $\theta$ (that is, the learned parameter $\theta$) of the probability distribution $q(x;\theta)$ learned using the probability distribution learning apparatus 1100. Further, the recording unit 1190, for example, records the average $m_{i\_0,j}$ and the variance $s_{i\_0,j}^2$ (j=1, ..., P) of the domain $D_j$ of the input data to be input to the inverse transformation $f_{i\_0}^{-1}$.

The operation of the data transformation apparatus 1200 will be described in accordance with FIG. 20. In S1110, the input data generating unit 1110 receives domain data s of the transformation source domain $D_{j\_0}$ which is input and a domain identifier $j_0$ of the transformation source domain $D_{j\_0}$ (which will be referred to as a transformation source domain identifier) as input, generates the input data x from the domain data s and outputs the input data x.

In S1220, the latent variable calculating unit 1220 receives the input data x generated in S1110 and the transformation source domain identifier $j_0$ as input, calculates the latent variable $z_0$ corresponding to the input data x from the input data x using the learned parameter θ and the average $m_{i\_0,j\_0}$ and the variance $s_{i\_0,j\_0}^2$ of the domain $D_{j\_0}$ of the input data to be input to the inverse transformation $f_{i\_0}^{-1}$ and outputs the latent variable $z_0$. The latent variable $z_0$ corresponding to the input data x is calculated using the following expression using the transformations $f_i$ (i=1, ..., K) used at the probability distribution learning apparatus 1100.

[Formula 37]

$$z_0 = f_1^{-1}(f_2^{-1}(\ldots(f_K^{-1}(x))\ldots)) \qquad (29)'$$

At this time, the learned parameter θ and the average $m_{i\_0,j\_0}$ and the variance $s_{i\_0,j\_0}^2$ of the domain $D_{j\_0}$ of the input data to be input to the inverse transformation $f_{i\_0}^{-1}$ are used. The latent variable calculating unit 1220 is different from the latent variable estimating unit 1120 of the probability distribution learning apparatus 1100 in this point.

In S1230, the output data calculating unit 1230 receives the transformation destination domain identifier $j_1$ which is an identifier of the transformation destination domain and the latent variable $z_0$ calculated in S1220 as input, calculates output data x' corresponding to the latent variable $z_0$ from the latent variable $z_0$ using the learned parameter θ and the average $m_{i\_0,j\_1}$ and the variance $s_{i\_0,j\_1}^2$ of the domain EU of the input data to be input to the inverse transformation $f_{i\_0}^{-1}$, and outputs the output data x'. The output data x' corresponding to the latent variable $z_0$ is calculated using the following expression using the transformations $f_i$ (i=1, ..., K) used at the probability distribution learning apparatus 1100.

[Formula 38]

$$x' = f_K(f_{K-1}(\ldots(f_1(z_0))\ldots)) \qquad (21)''$$

At this time, the learned parameter θ and the average $m_{i\_0,j\_1}$ and the variance $s_{i\_0,j\_1}^2$ of the domain $D_{j\_1}$ of the input data to be input to the inverse transformation $f_{i\_0}^{-1}$ are used. Note that it is only necessary to use a neural network obtained by changing output of the neural network NN which realizes the latent variable calculating unit 1220 to input, and changing input of the neural network NN to output, as the neural network which realizes the output data calculating unit 1230.

Figure 21:
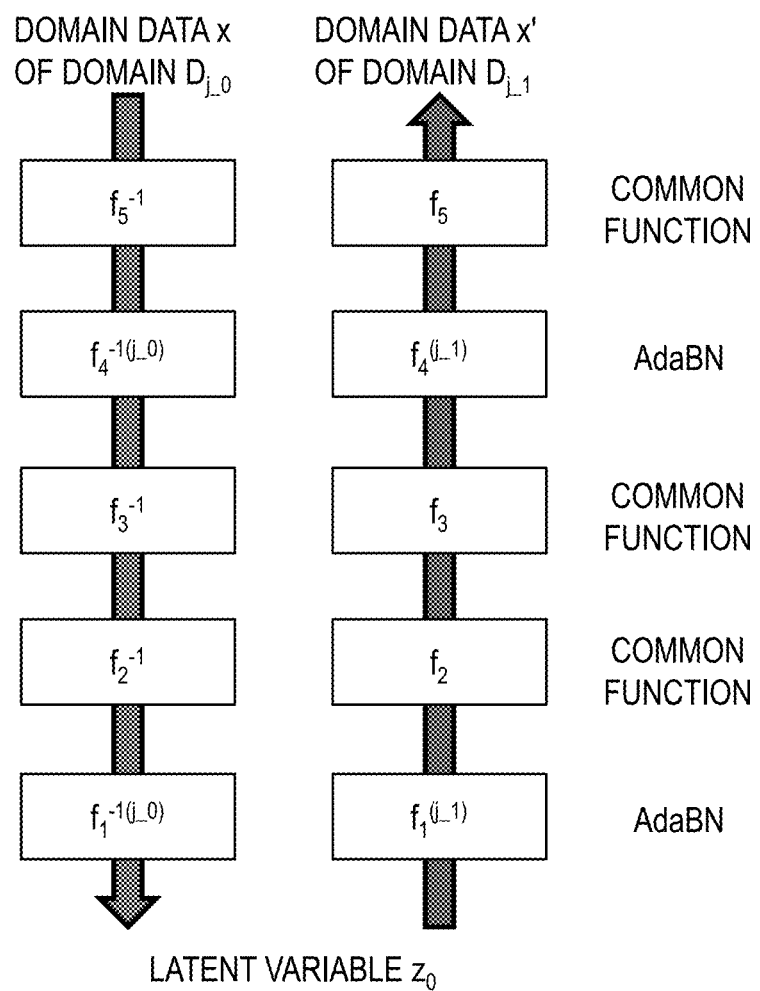
FIG. 21 is a view illustrating an aspect of processing by a latent variable calculating unit 1220 and an output data calculating unit 230.

An aspect of the processing by the latent variable calculating unit 1220 and the output data calculating unit 1230 is illustrated in FIG. 21. FIG. 21 illustrates an aspect where the input data is transformed into a latent variable, and the latent variable is transformed into output data using five transformations $\{f_i(z)\}_{i=1}^{5}$ used in description of <Technical background>. Here, $f_1^{-1(j\_0)}$, and $f_1^{(j\_1)}$ are functions using the average $m_{i\_0,j\_0}$ and the variance $s_{i\_0,j\_0}^2$ of the domain $D_{j\_0}$, and $f_4^{-1(j\_0)}$ and $f_4^{(j\_1)}$ are functions using the average $m_{i\_0,j\_1}$ and the variance $s_{i\_0,j\_1}^2$ of the domain $D_{j\_1}$.

In S1240, the domain data generating unit 1240 receives output data x' calculated in S1230 as input, generates transformed domain data s' which is data of the transformation destination domain $D_{j\_1}$ from the output data x' and outputs the transformed domain data s'.

Note that a component including the latent variable calculating unit 1220 and the output data calculating unit 1230 will be referred to as a data transforming unit 1205. In other words, the data transforming unit 1205 is a component which transforms input data generated from the domain data of the transformation source domain into output data which becomes a generation source of the domain data of the transformation destination domain.

According to the embodiment of the present invention, it becomes possible to mutually transform data between domains.

Ninth Embodiment

In the seventh embodiment, and the eighth embodiment, description has been provided assuming that P is an integer of 1 or greater, and domain data of P types of domains is used. Here, a data transformation apparatus 1300 in a case where P=2 will be described.

Figure 22:
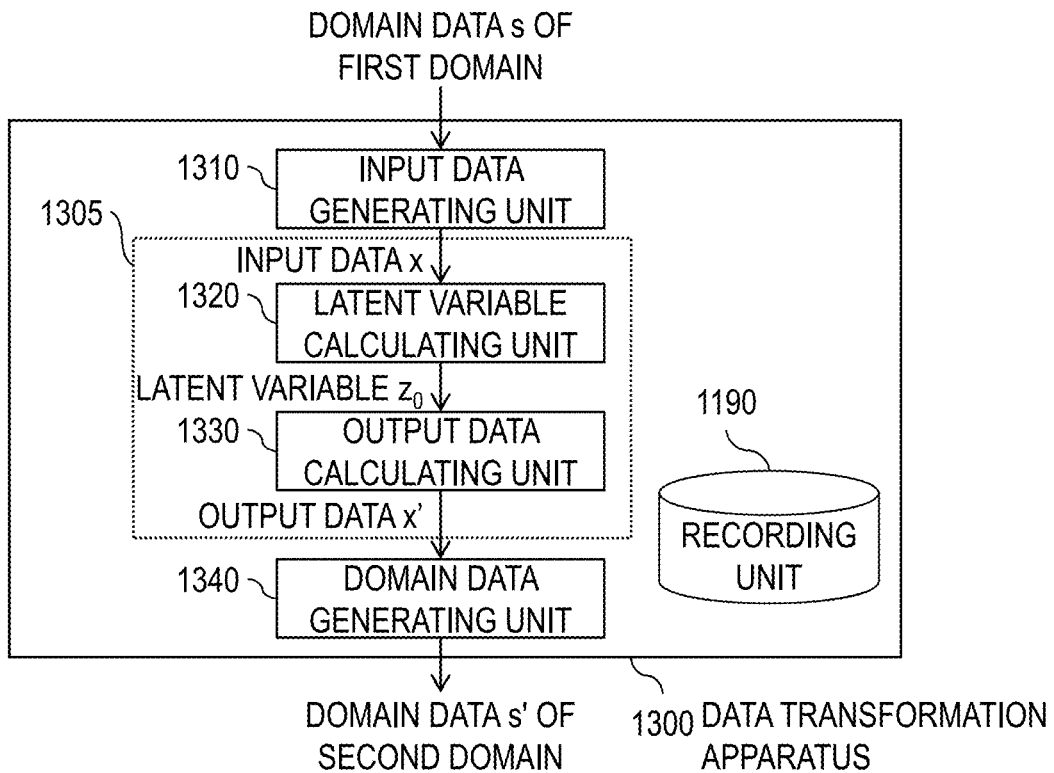
FIG. 22 is a block diagram illustrating an example of a configuration of a data transformation apparatus 1300.
Figure 23:
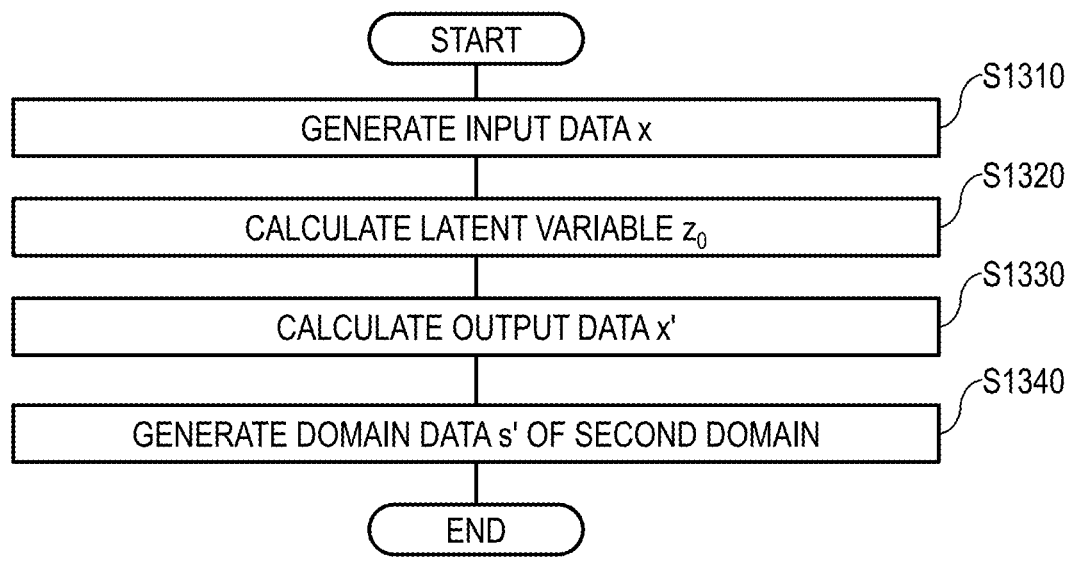
FIG. 23 is a flowchart illustrating an example of operation of the data transformation apparatus 1300.

The data transformation apparatus 1300 will be described below with reference to FIG. 22 to FIG. 23. FIG. 22 is a block diagram illustrating a configuration of the data transformation apparatus 1300. FIG. 23 is a flowchart illustrating operation of the data transformation apparatus 1300. As illustrated in FIG. 22, the data transformation apparatus 1300 includes an input data generating unit 1310, a latent variable calculating unit 1320, an output data calculating unit 1330, a domain data generating unit 1340, and a recording unit 1190. The recording unit 1190 is a component which records information necessary for processing of the data transformation apparatus 1300 as appropriate. The recording unit 1190, for example, records the parameter θ (that is, the learned parameter θ) of the probability distribution q(x;θ) learned using the probability distribution learning apparatus 1100.

Hereinafter, the transformation source domain will be referred to as a first domain, the transformation destination domain will be referred to as a second domain, and they are respectively expressed as $D_1$ and $D_2$. Further, at the latent variable calculating unit 1320, the average $m_{i\_0,1}$ and the variance $s_{i\_0,1}^2$ of the first domain $D_1$ of input data to be input to the inverse transformation $f_{i\_0}^{-1}$ are set. In a similar manner, at the output data calculating unit 1330, the average $m_{i\_0,2}$ and the variance $s_{i\_0,2}^2$ of the second domain $D_2$ of input data to be input to the inverse transformation $f_{i\_0}^{-1}$ are set.

The operation of the data transformation apparatus 1300 will be described in accordance with FIG. 23. In S1310, the input data generating unit 1310 receives the domain data s of the first domain as input, generates the input data x from the domain data s and outputs the input data x. Hereinafter, this input data will be also referred to as input data corresponding to domain data of the first domain.

In S1320, the latent variable calculating unit 1320 receives the input data x generated in S1310 as input, calculates the latent variable $z_0$ corresponding to the input data x from the input data x using the learned parameter θ and outputs the latent variable $z_0$.

In S1330, the output data calculating unit 1330 receives the latent variable $z_0$ calculated in S1320 as input, calculates output data x' corresponding to the latent variable $z_0$ from the latent variable $z_0$ using the learned parameter θ and outputs the output data x'.

In S1340, the domain data generating unit 1340 receives the output data x' calculated in S1330 as input, generates domain data s' of the second domain from the output data x' and outputs the domain data s'. Hereinafter, this output data will be also referred to as output data corresponding to domain data of the second domain.

Note that a component including the latent variable calculating unit 1320 and the output data calculating unit 1330 will be referred to as a data transforming unit 1305. In other words, the data transforming unit 1305 is a component which transforms the input data corresponding to the domain data of the first domain into the output data corresponding to the domain data of the second domain.

As can be understood from the above description, it can be said that the latent variable calculating unit 1320 performs calculation using a function (hereinafter, referred to as a first function) which transforms the latent variable into input data and which has an inverse function, and the output data calculating unit 1330 performs calculation using a function (hereinafter, referred to as a second function) which transforms the latent variable into output data and which has an inverse function. Then, the first function and the second function are derived from a predetermined function which transforms the latent variable $z_0$ into the variable x. This predetermined function is a function obtained using a union of the first domain and the second domain. More specifically, the predetermined function is a function obtained as a function expressed as $x=f_K(f_{K-1}(\ldots(f_1(z_0))\ldots))$ using transformations $f_i$($i=1,\ldots,K$, K is an integer of 1 or greater, inverse transformations $f_i^{-1}$ exist for the transformations $f_i$, and at least one inverse transformation $f_{i\_0}^{-1}$ ($1\leq i_0\leq K$) of the transformations $f_i$($i=1,\ldots,K$) is adaptive batch normalization) through learning using domain data which is an element of the union of the first domain and the second domain as learning data. Further, the first function is derived from the above-described predetermined function using an amount of statistics (specifically, the average $m_{i\_0,1}$ and the variance $s_{i\_0,1}^2$ of the first domain $D_1$ of the input data to be input to the inverse transformation $f_{i\_0}^{-1}$) calculated from the domain data of the first domain included in the union, and the second function is derived from the predetermined function using an amount of statistics (specifically, the average $m_{i\_0,2}$ and the variance $s_{i\_0,2}^2$ of the second domain $D_2$ of the input data to be input to the inverse transformation $f_{i\_0}^{-1}$) calculated from the domain data of the second domain included in the union.

Application Example: Application to Supervised Anomaly Detection Problem

It is possible to apply the data transformation apparatus 1300 to the supervised anomaly detection problem. Here, supervised anomaly detection is a framework which learns an anomaly detection model from a large number of pieces of normal data and a small number of pieces of anomaly data and performs anomaly detection using this anomaly detection model.

While it is possible to learn a model with higher accuracy as the number of pieces of anomaly data is larger, it is difficult to collect a large number of pieces of anomaly data. Therefore, a plurality of domains which are desired to be set as anomaly detection targets are prepared, and data as much as possible is collected, and the model parameter θ is learned from the data using the probability distribution learning apparatus 1100. Then, the anomaly data of the first domain is transformed into the anomaly data of the second domain different from the first domain using the data transformation apparatus 1300. By this technique, it is possible to artificially create anomaly data which is difficult to be collected, so that it is possible to increase the number of pieces of anomaly data, which results in making it possible to learn an anomaly detection model with higher accuracy.

For example, the parameter θ is learned using the probability distribution learning apparatus 1100 while setting a set of sound emitted from one or more pieces of equipment different from the anomaly detection target equipment as the first domain and setting a set of sound of the anomaly detection target equipment as the second domain. Then, sound of the anomaly detection target equipment is generated as the domain data of the second domain from the anomalous sound emitted from one or more pieces of equipment different from the anomaly detection target equipment, which is domain data of the first domain, using the data transformation apparatus 1300. The generated sound of the anomaly detection target equipment is expected to be anomalous sound. Further, the anomaly detection model of the second domain is learned using the generated sound of the anomaly detection target equipment as learning data.

Note that it is considered that most of the emitted sound is normal sound. Because it is preferable to use data as much as possible upon learning, it would be better to use sound of the first domain for learning regardless whether the sound is normal sound or anomalous sound.

According to the embodiment of the present invention, it becomes possible to mutually transform data between domains. As a result, for example, it becomes possible to efficiently generate anomaly data to be used for learning of an anomaly detection model.

Experimental Result

Learning is performed while a set of "landscape photographs" and a set of "landscapes" are set as domains, and Glow disclosed in Reference non-patent literature 8 is employed as an architecture of Normalizing Flow, and using a neural network AdaFlow in which Activation Normalization of Glow is replaced with AdaBN. 400 pieces of image data of landscape photographs and 400 pieces of image data of landscapes are collected, and the neural network AdaFlow is caused to perform learning using these pieces of image data, and data transformation is performed. Specifically, the "landscape photographs" are transformed into "landscapes" or the "landscapes" are transformed into "landscape photographs".

(Reference non-patent literature 8: Diederik P. Kingma, Prafulla Dhariwal, "Glow: Generative Flow with Invertible 1×1 Convolutions", arXiv:1807.03039, https://arxiv.org/abs/1807.03039)

It could be confirmed that image data with high quality is generated through this experiment, that is, domain transformation without pair data using AdaFlow.

APPENDIX

Figure 24:
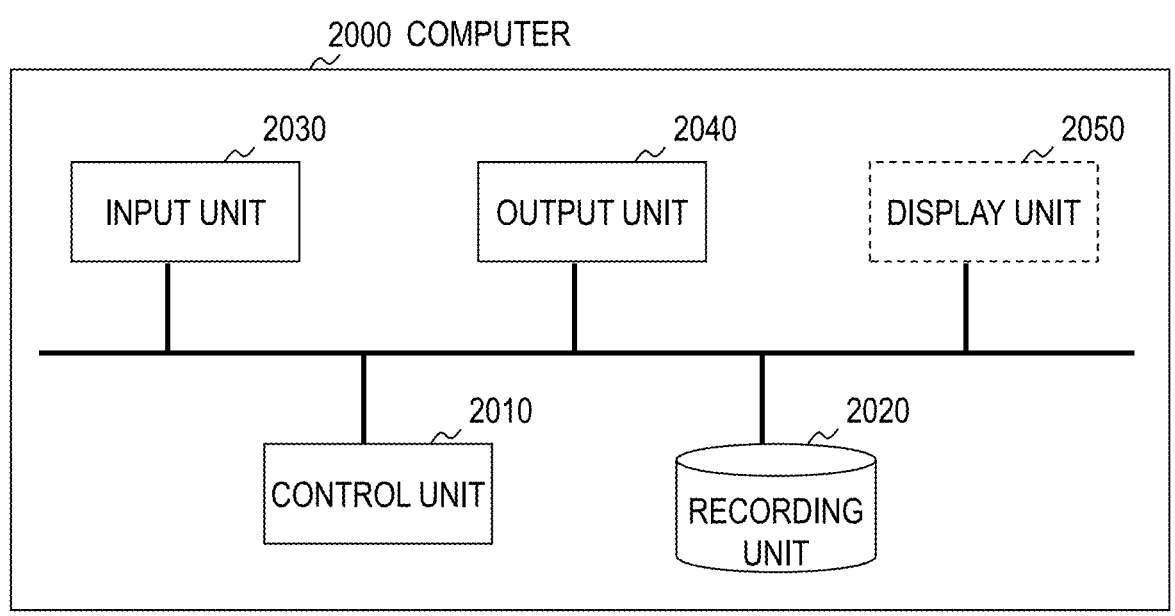
FIG. 24 is a view illustrating an example of a functional configuration of a computer which realizes each apparatus in embodiments of the present invention.

FIG. 24 is a view illustrating an example of a functional configuration of a computer which realizes the above-described each apparatus. Processing at the above-described each apparatus can be realized by a recording unit 2020 being caused to read a program for causing the computer to function as the above-described each apparatus, and a control unit 2010, an input unit 2030, an output unit 2040, or the like, being caused to operate.

The apparatus of the present invention includes an input unit to which a keyboard, or the like, can be connected, an output unit to which a liquid crystal display, or the like, can be connected, a communication unit to which a communication apparatus (for example, a communication cable) which can perform communication with outside of hardware entity can be connected, a CPU (Central Processing Unit, which may include a cache memory, a register, or the like), a RAM and a ROM which are memories, an external storage apparatus which is a hard disk, and a bus which connects these input unit, output unit, communication unit, CPU, RAM, ROM, and external storage apparatus so as to be able to exchange data among them, for example, as single hardware entity. Further, as necessary, it is also possible to provide an apparatus (drive), or the like, which can perform read to and write from a recording medium such as a CD-ROM, at the hardware entity. Examples of physical entity including such hardware resources can include a general-purpose computer.

At the external storage apparatus of the hardware entity, a program which is necessary for realizing the above-described functions and data, or the like, which are necessary for processing of this program are stored (the apparatus is not limited to the external storage apparatus, and, a program may be stored in, for example, a ROM which is a read-only storage apparatus). Further, data, or the like, obtained through processing of these programs are stored in a RAM, an external storage apparatus, or the like, as appropriate.

At the hardware entity, each program stored in the external storage apparatus (or the ROM, or the like), and data necessary for processing of each program are read to a memory as necessary, and interpretive execution and processing are performed at the CPU as appropriate. As a result, the CPU realizes predetermined functions (respective components indicated above as parts, units, or the like).

The present invention is not limited to the above-described embodiments, and can be changed as appropriate within the scope not deviating from the gist of the present invention. Further, the processing described in the above-described embodiment may be executed parallelly or individually in accordance with processing performance of apparatuses which execute processing or as necessary as well as being executed in chronological order in accordance with description order.

As described above, in a case where the processing functions at the hardware entity (the apparatus of the present invention) described in the above-described embodiments are realized with a computer, processing content of the functions which should be provided at the hardware entity is described with a program. Then, by this program being executed by the computer, the processing functions at the hardware entity are realized.

The program describing this processing content can be recorded in a computer-readable recording medium. As the computer-readable recording medium, for example, any medium such as a magnetic recording apparatus, an optical disk, a magnetooptical recording medium and a semiconductor memory may be used. Specifically, for example, it is possible to use a hard disk apparatus, a flexible disk, a magnetic tape, or the like, as the magnetic recording apparatus, and use a DVD (Digital Versatile Disc), a DVD-RAM (Random Access Memory), a CD-ROM (Compact Disc Read Only Memory), a CD-R (Recordable)/RW (ReWritable), or the like, as the optical disk, use an MO (Magneto-Optical disc), or the like, as the magnetooptical recording medium, and use an EEP-ROM (Electronically Erasable and Programmable-Read Only Memory), or the like, as the semiconductor memory.

Further, this program is distributed by, for example, a portable recording medium such as a DVD and a CD-ROM in which the program is recorded being sold, given, lent, or the like. Still further, it is also possible to employ a configuration where this program is distributed by the program being stored in a storage apparatus of a server computer and transferred from the server computer to other computers via a network.

A computer which executes such a program, for example, first, stores a program recorded in the portable recording medium or a program transferred from the server computer in the storage apparatus of the own computer once. Then, upon execution of the processing, this computer reads the program stored in the storage apparatus of the own computer and executes the processing in accordance with the read program. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by so-called ASP (Application Service Provider) type service which realizes processing functions only by an instruction of execution and acquisition of a result without the program being transferred from the server computer to this computer. Note that, it is assumed that the program in the form includes information which is to be used for processing by an electronic computer, and which is equivalent to a program (not a direct command to the computer, but data, or the like, having property specifying processing of the computer).

Further, while, in this form, the hardware entity is constituted by a predetermined program being executed on the computer, at least part of the processing content may be realized with hardware.

The above description of the embodiments of the present invention is presented for illustrative and descriptive purpose. The description is neither intended to provide exhaustive description, nor intended to limit the invention to the disclosed strict form. Modifications and variation are possible from the above-described teaching. The embodiments are selected and expressed so as to provide the best example of the principle of the present invention and so as to enable a person skilled in the art in this field to utilize the present invention in various embodiments or by adding various modifications so as to be suitable for deliberated actual use. All such modifications and variations are within the scope of the present invention defined in the attached claims interpreted in accordance with a rightly, legally and fairly provided range.

What is claimed is:

1. An anomaly detection apparatus comprising a processor configured to execute operations comprising:
  receiving an anomaly detection target sound, wherein the anomaly detection target sound comprises a first sound signal emitted from anomaly detection target equipment; and
  estimating, by a trained anomaly detection neural network including a layer of adaptive batch normalization, an anomaly degree, wherein the anomaly degree indicates a degree of anomaly of the anomaly detection target equipment, the trained anomaly detection neural network generates the anomaly degree from the anomaly detection target sound comprising the first sound signal as input, the anomaly degree is based on association between a first probability distribution and a first normal sound, the first normal sound comprises a second sound signal emitted from the anomaly detection target equipment, the first probability distribution indicates distribution of a second normal sound, and the second normal sound comprises a third sound signal emitted from one or more pieces of equipment that are different from the anomaly detection target equipment.

2. The anomaly detection apparatus according to claim 1, wherein the association is a second probability distribution, wherein the second probability distribution indicates distribution of the first normal sound emitted from the anomaly detection target equipment, which is obtained by updating the first probability distribution using the first normal sound.

3. The anomaly detection apparatus according to claim 2, wherein a variable x of the second probability distribution $q_2(x;\theta)$ is a variable indicating input data generated from the first normal sound emitted from the anomaly detection target equipment, the variable x is expressed as $x=f_K(f_{K-1}(\ldots(f_1(z_0))\ldots))$ using transformations $f_i(i=1,\ldots,K$, K is an integer of 1 or greater, and inverse transformations $f_i^{-1}$ exist for the transformations $f_i$) and a latent variable $z_0$, $q_0(z_0)$ is set as a probability distribution of the latent variable $z_0$, and a probability density $q_2(x;\theta)$ of the input data x is calculated using a probability density $q_0(z_0)$ of the latent variable $z_0=f_1^{-1}(f_2^{-1}(\ldots(f_K^{-1}(x))\ldots))$ corresponding to the input data x.

4. The anomaly detection apparatus according to claim 3, wherein at least one inverse transformation of the transformations $f_i(i=1,\ldots,K)$ is adaptive batch normalization.

5. The anomaly detection apparatus according to claim 3, wherein the second probability distribution $q_2(x;\theta)$ is expressed using the following expression $$q_2(x;\theta)=q_0(z_0)|\det(\partial f_K(z_{K-1};\theta_K)/(\partial z_{K-1})||\det(\partial f_{K-1}(z_{K-2};\theta_{K-1})/(\partial z_{K-2})|\ldots|\det(\partial f_1(z_0;\theta_1)/\partial z_0)| \quad \text{[Formula 39]}$$

(where $z_1=f_1(z_0;\theta_1)$, $z_2=f_2(z_1;\theta_2)$, ..., $x=f_K(z_{K-1};\theta_K)$, $\theta_i(i=1,\ldots,K)$ are parameters corresponding to the transformations $f_i$, and $\theta=[\theta_1^T, \theta_2^T, \ldots, \theta_K^T]^T$).

6. The anomaly detection apparatus according to claim 4 wherein at least one inverse transformation of the transformations $f_i(i=1,\ldots,K)$ is linear transformation, and a matrix corresponding to the linear transformation is expressed as a product of a lower triangular matrix and an upper triangular matrix or a product of a lower triangular matrix, a diagonal matrix and an upper triangular matrix.

7. A probability distribution learning apparatus comprising a processor configured to execute operations comprising:

receiving normal sounds for learning, wherein the normal sounds for learning are normal sounds emitted from one or more pieces of equipment that are different from anomaly detection target equipment; and learning a first probability distribution, wherein the first probability distribution indicates distribution of normal sound emitted from one or more pieces of equipment that are different from the anomaly detection target equipment, from the normal sounds for learning, wherein a variable x of the first probability distribution $q_1(x;\theta)$ is a variable indicating input data generated from the normal sound emitted from the one or more pieces of equipment different from the anomaly detection target equipment, the variable x is expressed as $x=f_K(f_{K-1}(\ldots(f_1(z_0))\ldots))$ using transformations $f_i(i=1,\ldots,K,$ K is an integer of 1 or greater, and inverse transformations fil exist for the transformations $f_i$) and a latent variable $z_0$, $q_0(z_0)$ is set as a probability distribution of the latent variable $z_0$, a probability density $q_1(x;\theta)$ of the input data x is calculated using a probability density $q_0(z_0)$ of the latent variable $z_0=f_1^{-1}(f_2^{-1}(\ldots(f_K^{-1}(x))\ldots))$ corresponding to the input data x, and at least one inverse transformation of the transformations $f_i(i=1,\ldots,K)$ is adaptive batch normalization; and transmitting the first probability distribution to an application configured to train anomaly detection neural network using the first probability distribution as anomaly training data.

8. The probability distribution learning apparatus according to claim 7, wherein at least one inverse transformation of the transformations $f_i(i=1,\ldots,K)$ is linear transformation, and a matrix corresponding to the linear transformation is expressed as a product of a lower triangular matrix and an upper triangular matrix or a product of a lower triangular matrix, a diagonal matrix and an upper triangular matrix.

9. An anomaly detection apparatus comprising a processor configured to execute operations comprising:

receiving an anomaly detection target sound, wherein the anomaly detection target sound comprises a first sound signal emitted from anomaly detection target equipment; and estimating, by an autoencoder configured as a trained neural network including a layer of adaptive batch normalization, an anomaly degree, wherein the anomaly degree indicates a degree of anomaly of the anomaly detection target equipment, the trained neural network generates the anomaly degree from the anomaly detection target sound comprising the first sound signal as input, the anomaly degree is based on association between a first autoencoder and a first normal sound, the first normal sound comprises a second sound signal emitted from the anomaly detection target equipment, the first autoencoder restores a second normal sound, and the second normal sound comprises a third sound signal emitted from one or more pieces of equipment that are different from the anomaly detection target equipment.

10. The anomaly detection apparatus according to claim 9, wherein the association is a second autoencoder, wherein the second autoencoder restores the first normal sound emitted from the anomaly detection target equipment, which is obtained by updating the first autoencoder using the first normal sound.

11. The anomaly detection apparatus according to claim 10, wherein the first autoencoder is configured as a neural network including an AdaBN layer which executes calculation of adaptive batch normalization.

12. An anomaly detection apparatus comprising a processor configured to execute operations comprising:

receiving an anomaly detection target sound, wherein the anomaly detection target sound comprises a first sound signal emitted from anomaly detection target equipment; and estimating, by a trained machine learning model, an anomaly degree, wherein the anomaly degree indicates a degree of anomaly of the anomaly detection target equipment, the trained machine learning model generates the anomaly degree from the anomaly detection target sound comprising the first sound signal as input, the anomaly degree is based on association between a set of first normal sounds and a second normal sound, the first normal sound comprises a second sound signal emitted from one or more pieces of equipment that are different from the anomaly detection target equipment, and the second normal sound comprises a third sound signal emitted from the anomaly detection target equipment.

13. A data transformation apparatus comprising a processor configured to execute operations comprising:

retrieving input data, wherein the input data corresponds to domain data of a first domain;

calculating a latent variable from the input data using a first predetermined function having an inverse function; and calculating output data, wherein the output data correspond to domain data of a second domain, from the latent variable using a second predetermined function having an inverse function, wherein the first predetermined function and the second predetermined function are derived from a third predetermined function which transforms the latent variable $z_0$ into a variable x; and transmitting the output data to an application configured to train neural network model using the output data as training data.

14. The data transformation apparatus according to claim 13, wherein the third predetermined function is a function obtained using a union of the first domain and the second domain.

15. The data transformation apparatus according to claim 14, wherein the third predetermined function is a function obtained as a function expressed as $x=f_K(f_{K-1}(\ldots(f_1(z_0))\ldots))$ using the transformations $f_i(i=1,\ldots,K,$ K is an integer of 1 or greater, inverse transformations $f_i^{-1}$ exist for the transformations $f_i$, and at least one inverse transformation of the transformations $f_i(i=1,\ldots,K)$ is adaptive batch normalization) through learning using domain data of the union as learning data.

16. The data transformation apparatus according to claim 15, wherein the first predetermined function is derived from the third predetermined function using an amount of statistics calculated from domain data of the first domain included in the union, and the second predetermined function is derived from the third predetermined function using an amount of statistics calculated from domain data of the second domain included in the union.

17. The data transformation apparatus according to claim 14, wherein the first domain is a set of sound emitted from one or more pieces of equipment different from anomaly detection target equipment, the second domain is a set of sound of the anomaly detection target equipment, and domain data of the first domain is anomalous sound emitted from the one or more pieces of equipment different from the anomaly detection target equipment.

18. The anomaly detection apparatus according to claim 5, wherein at least one inverse transformation of the transformations $f_i(i=1,\ldots,K)$ is linear transformation, and a matrix corresponding to the linear transformation is expressed as a product of a lower triangular matrix and an upper triangular matrix or a product of a lower triangular matrix, a diagonal matrix and an upper triangular matrix.

19. A non-transitory computer-readable storage medium stores a program for causing a computer to function as the anomaly detection apparatus according to any one of claims 1 to 6 or 9 to 11 or 12 or 18.

* * * * *